(12) United States Patent
Ikegami et al.

(10) Patent No.: US 6,552,451 B1
(45) Date of Patent: Apr. 22, 2003

(54) STEPPING MOTOR, PRINTING DEVICE USING IT OR PAPER FEEDING DEVICE, AND PRINTER

(75) Inventors: Akihiko Ikegami, Suwa (JP); Yoshikazu Koike, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/424,364

(22) PCT Filed: Mar. 25, 1999

(86) PCT No.: PCT/JP99/01532

§ 371 (c)(1),
(2), (4) Date: Mar. 2, 2000

(87) PCT Pub. No.: WO99/50952

PCT Pub. Date: Oct. 7, 1999

(30) Foreign Application Priority Data

Mar. 26, 1998 (JP) .......................................... 10-079875
Mar. 31, 1998 (JP) .......................................... 10-087256
Mar. 31, 1998 (JP) .......................................... 10-087455

(51) Int. Cl.$^7$ ................................................ H02K 37/04
(52) U.S. Cl. ................................. 310/49 R; 310/216
(58) Field of Search ........................ 310/49 R, 51, 310/216

(56) References Cited

U.S. PATENT DOCUMENTS

| | | | |
|---|---|---|---|
| 4,516,048 A | 5/1985 | Brigham | 310/254 |
| 4,703,243 A | 10/1987 | Ettelman | 318/696 |
| 4,910,475 A | * 3/1990 | Lin | 310/49 R |
| 5,708,310 A | * 1/1998 | Sakamoto et al. | 310/49 R |

FOREIGN PATENT DOCUMENTS

| | | |
|---|---|---|
| JP | 6-14779 | 2/1994 |
| JP | 9-308213 | 11/1997 |

* cited by examiner

*Primary Examiner*—Karl Tamai
(74) *Attorney, Agent, or Firm*—Kanesaka & Takeuchi

(57) ABSTRACT

A stepping motor (1) which has rotor pole teeth (31) disposed with a predetermined pitch (P1) on a rotor (3) and stator pole teeth (22) formed on a stator pole (21) so to oppose the rotor pole teeth (31), wherein the stator poles (21) are provided with n sets of tooth groups (23) consisting of the stator pole teeth (22) in the number of m, a pitch P2 of the stator pole teeth (22) in the tooth groups (23) is in the relation P2≠P1, and a pitch P3 of the tooth groups (23) is in the relations P3≠m·P1 and P3≠m·P2 (where, P1, P2 and P3 denote an electrical angle, and m and n are integers of 2 or more), and a three-phase stepping motor in which the fourth harmonic and the sixth harmonic are decreased.

6 Claims, 40 Drawing Sheets

AVERAGE OF TOOTH WIDTH RATIO OF FIRST LAYER

AVERAGE OF TOOTH WIDTH RATIO OF SECOND LAYER

AVERAGE OF TOOTH WIDTH RATIO OF THIRD LAYER

FIG. 23
(a)
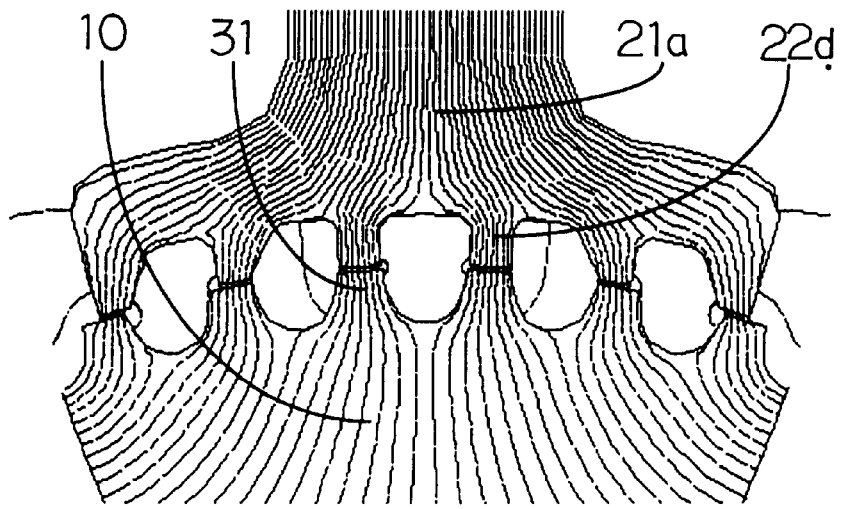
(b)
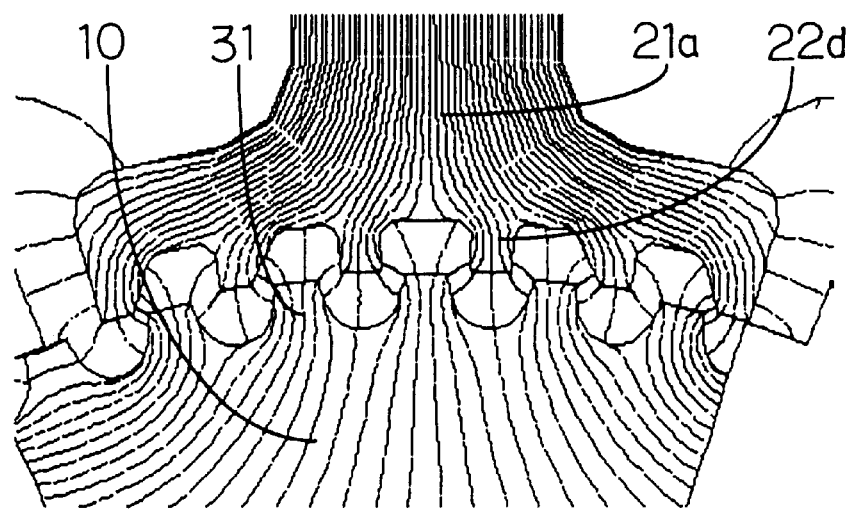

FIG. 26
(a)
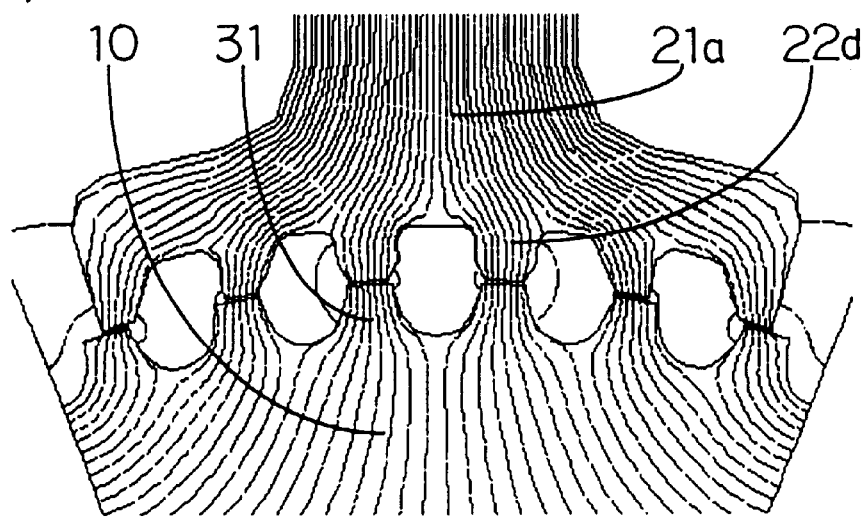
(b)
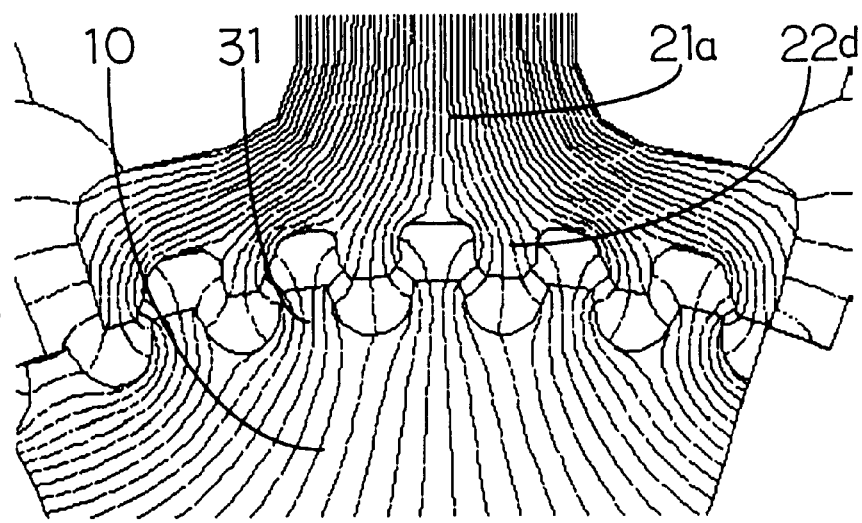

FIG. 36 PIOR ART

FIG. 39 PRIOR ART
(a)
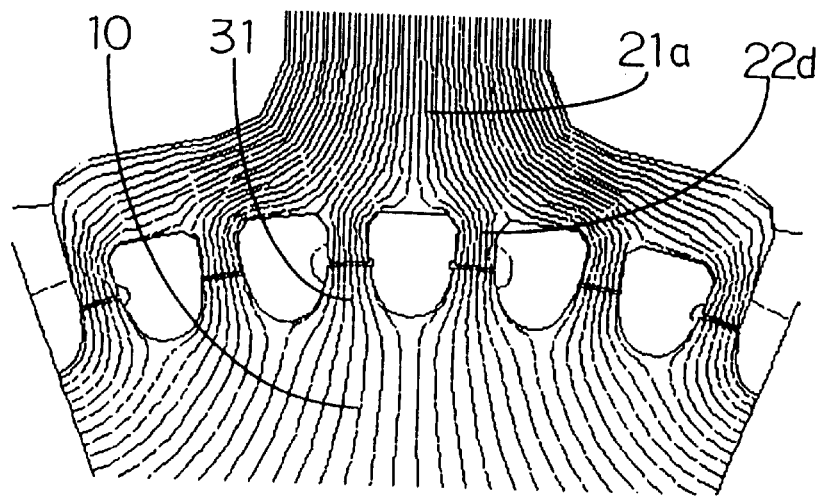
(b)
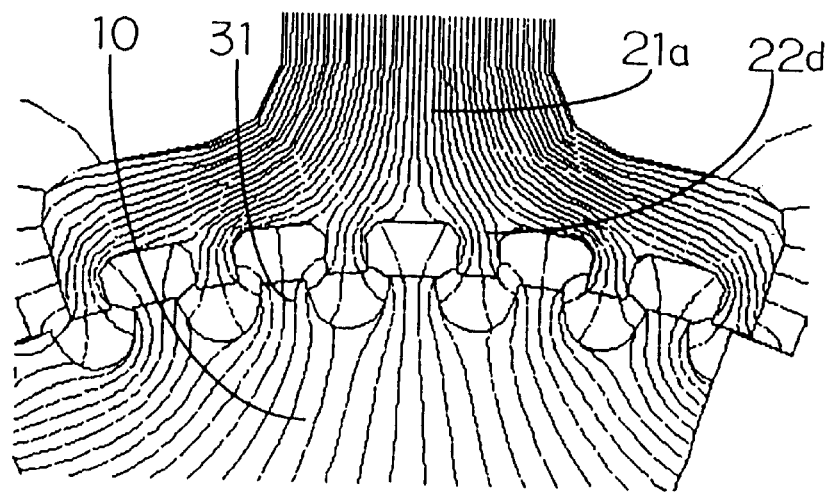

FIG. 40 PRIOR ART
(a)
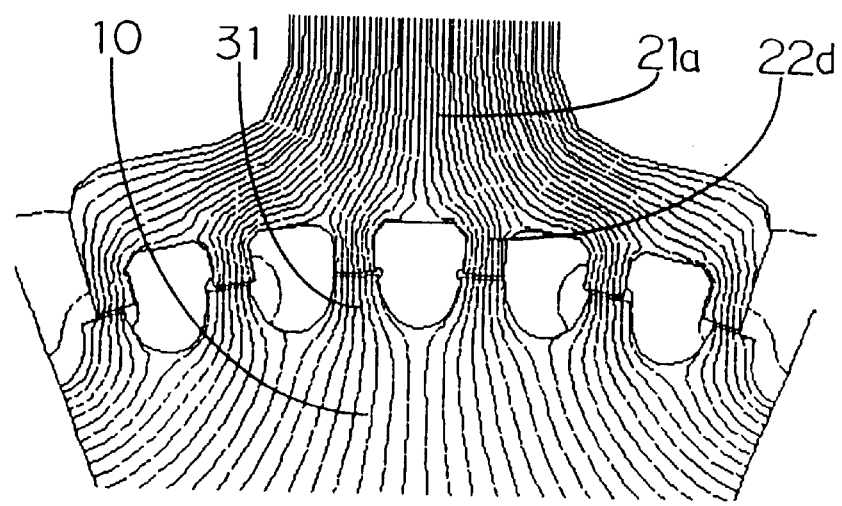
(b)
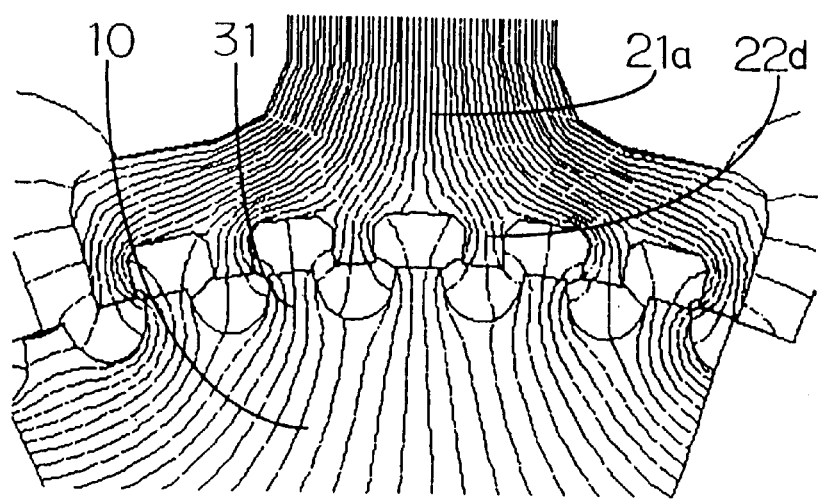

STEPPING MOTOR, PRINTING DEVICE USING IT OR PAPER FEEDING DEVICE, AND PRINTER

TECHNICAL FIELD

The present invention relates to a stepping motor from which vibration and noise are reduced and to a print device or a paper feed device and a printer using it.

BACKGROUND ART

Recently, a stepping motor which outputs a mechanical angle corresponding to an input electrical pulse is extensively used as power for paper feeding, head driving, drum driving or the like of a reproducing machine such as a printer, a scanner, a facsimile machine and the like.

Especially, equipment required having high torque and high accuracy conspicuously uses a hybrid stepping motor in which magnetic flux is formed by a permanent magnet without exciting the motor. That is because such a stepping motor has advantages that it is compact and fast but inexpensively provides power for outputting high torque, does not require a position sensor/encoder and can be controlled easily.

For example, FIG. 29 is a sectional diagram showing a basic structure of a stator and a rotor of a stepping motor. This stepping motor has a stator 2 which has a plurality of stator poles 21 and a rotor 3 which is arranged to oppose these stator poles 21 with a space therebetween. Rotor pole teeth 31 are formed with a given pitch on the rotor 3, and stator pole teeth 22 are formed on each stator pole 21 to oppose the rotor pole teeth 31, so that torque is caused in an output axis 5 by exciting a stator coil 4 disposed on each stator pole 21.

As equipments are being made to operate faster with higher accuracy in recent years, there are disadvantages of vibration and noise caused due to detent torque peculiar to the stepping motor when the motor is running. And, it is an important issue to find a method of reducing the vibration and noise.

To solve the disadvantage, there is conventionally adopted a method of reducing the harmonic contained in the detent torque by setting the pitch of the stator pole teeth to be different from the pitch of the rotor pole teeth.

Generally, it is assumed that the pitch of the rotor pole teeth is PR, the pitch of the stator pole teeth is PS and the number of the stator pole teeth is m, and when they are in the following relation:

$$PS=PR\{1\pm 1/(m\cdot v)\}$$

it is known that a plurality of harmonics containing the order v are lowered. And, such a structure is adopted to the stepping motor which is disclosed in, for example, Japanese Patent Publication No. Hei 6-14779 and the like.

When the pitch PS of the stator pole teeth is displaced to be made narrow or wide by $\{PR/(m\cdot v)\}$ with respect to the pitch PR of the rotor pole teeth, a phase of detent torque caused in each stator pole tooth is displaced appropriately, and specific harmonics cancel each other out.

For example, FIG. 30 is an explanatory diagram showing pitch P1 of the rotor pole teeth 31 and pitch P2 of the stator pole teeth 22 of a conventional stepping motor.

FIG. 30 shows that each stator pole 21 has six stator pole teeth 22, and the pitch PS of the stator pole teeth 22 is set to be narrower (or wider) than the pitch PR of the rotor pole teeth 31 by (PR/18). The harmonics decreased by this structure is not only a third harmonic but also the harmonics of the orders of multiples of three, that is, 6, 9 and 12.

Actually, a three-phase motor was formed by using a stator which has six stator poles and a rotor having 38 rotor pole teeth as shown in FIG. 30. And, its detent torque characteristic was measured. The result shown in FIG. 31 was obtained.

The same measurement was made on a plurality of motors produced experimentally, and the order of the harmonic with respect to detent torque characteristic was analyzed with the frequency, and obtained the results as shown in FIG. 32.

A motor was also produced by using a stator having the same pitch of the stator pole teeth with the pitch of the rotor pole teeth and subjected to the frequency analysis. The results as shown in FIG. 33 and FIG. 34 were obtained.

By comparing the results obtained above, it was confirmed that the sixth harmonic and the 12th harmonic were remarkably decreased when the pitch of the stator pole teeth was determined as shown in FIG. 30.

In the aforesaid drawings, variations in the first and second harmonics seem to result from a dimensional error of the stator and the rotor, eccentricity of the rotation axis or the like.

It is assumed that the nearer the amplitude of the harmonic of each order of the aforesaid stepping motor becomes 0 gcm, the lower the vibration and the noise become.

The harmonics caused in the respective stator poles with different phases are mutually weakened or strengthened, so that the order of detent torque which particularly becomes a problem is decided according to the number of phases and the number of the stator poles.

With the three-phase motor, the fourth harmonic is canceled by the layout of the three-phase structure, and the sixth harmonic becomes a problem. And the aforesaid pitch of the stator pole teeth is set corresponding to such conditions.

In practice, however, it was very hard to achieve satisfactory quietness by the aforesaid structure.

Specifically, when an effect is to be obtained from the layout between the phases and between the stator poles, the accuracy of motor parts manufacturing and assembling processes is extremely restricted, and as a result, a sufficient effect can not be achieved due to a little dimensional error.

It is apparent from FIG. 31 through FIG. 34 that the fourth-order harmonic and the like, which must not constitute a matter of concern as compared with the sixth-order harmonic theoretically, appear largely.

Accordingly, in view of the aforesaid problems, it is an object of the invention to provide a stepping motor which efficiently lowers a harmonic of detent torque and provides quieter and smoother rotations.

As described above, when the stepping motor is driven, its undesired vibration and noise are reduced by lowering or removing detent torque.

The detent torque is torque which retains the rotor in a given position by disposing permanent magnets and the like on the rotor without exciting a stator coil and the like and discriminated from static torque indicated by a so-called stiffness characteristic.

For the stator 2 and the rotor 3 shown in FIG. 29, permanent magnets are arranged in the key points of the rotor 3. The detent torque is present between each stator pole tooth 22 of the stator poles 21 and the rotor pole teeth 31 of the rotor 3 and becomes a total of the detent torque, which exist between the individual pole teeth, as the entire motor. In other words, it is configured that the detent torque caused between the stator pole teeth 22 and the rotor pole teeth 31 which have different phases in the circumferential direction are canceled each other.

The detent torque of one stator pole tooth is represented by a sine wave which has the same cycle with the pitch of the rotor pole teeth. Actually, however, a harmonic component is contained therein, so that it has a complex waveform including distortion as shown in FIG. 35.

Since this harmonic component disturbs the smooth rotations of the rotor, undesired vibration and noise are caused when the motor is running.

Particularly, as disclosed in Japanese Patent Laid-Open Publication No. Hei 9-308213, the stator pole teeth paired mutually are conventionally configured to mutually cancel particular harmonics by properly determining a pitch of the individual pole teeth. But, it was not satisfactory because it was influenced easily by a magnetic imbalance due to eccentricity, falling or the like of the rotor with respect to the stator.

Specifically, the stator pole teeth and the rotor pole teeth usually have a very narrow gap length of tens of μm. Therefore, the aforesaid mutual cancellation becomes incomplete because a difference is caused in the size of the harmonics of both the pole teeth due to eccentricity, falling or the like of the rotor.

And, the reluctance motor pole shape and torque characteristic by Institute of Electrical Engineering (or American Institute of Electrical Engineers), Rotating Machine Research Group, RM-95-55 discloses that when inductance distributions are compared between a case that the rotor has a tooth width narrower than that of the stator and a case that the rotor has a tooth width wider than that of the stator to have the middle between the two inductance distributions, the space distribution of inductance may become very close to the sine wave, so that the rotors having different tooth widths can be stacked. But, since its structure is not apparent, it is hardly put to practical use. Besides, it does not remedy the aforesaid disadvantages resulting from eccentricity, falling or the like of the rotor.

Therefore, in view of the aforesaid problems, it is an object of the invention to provide a stepping motor which can reduce undesired vibration and noise caused by detent torque.

FIG. 36 is a developed diagram showing the arrangement of pole teeth of a conventional two-phase hybrid stepping motor. The stator pole 21 is provided with six pole teeth which have equal pitch 4θs (θs indicates a basic step angle). But, the stepping motor involves vibration and noise because of its operation principle. It is because the stepping motor has detent torque which is periodically produced with respect to a rotation angle of the rotor. Accordingly, technologies have been proposed to improve accuracy of parts which configure the motor and accuracy of assembling such parts in order to reduce the vibration and noise. To decrease the harmonic component of the detent torque, there has been provided an idea of deviating the pitches of the stator pole teeth.

FIG. 37 is a developed diagram showing a positional relation of the pole teeth of a conventional hybrid stepping motor with the pitch of its pole teeth displaced. The pole teeth of the motor shown in FIG. 37 are formed by displacing the positions of the six pole teeth 22 of the stator pole 21 arranged at the equal pitch, i.e., two pole teeth 22c, 22d are not displaced, two pole teeth 22a, 22b are displaced in a forward direction, and two pole teeth 22e, 22f are displaced in a lagging direction. In FIG. 37, the forward direction is rightward.

FIG. 38 is a graph indicating each order component of the torque in this case. FIG. 38 shows a relation between the displacement of the pole teeth and each order component of the torque of the motor with the teeth displaced as shown in FIG. 37. It is assumed that an amount of displacement (mechanical angle) of the pole teeth from the position disposed at the equal pitch is α, a displaced pitch is $d_t$ and a basic step angle is $θ_s$. Then, they are related as indicated by the following expression (1).

$$α = d_t \cdot 4θ_s \qquad (1)$$

The ν-th order component T(ν) of the torque was obtained by the following expression.

$$T(v) = k_v v \left| \sum_{i=1}^{n} \sin(v(θ_m + d_t \cdot 2π)) \right|$$

In the above expression, $k_v$ is a coefficient of harmonic of the order ν, θm is an electrical angle indicating the position of the pole tooth, and n, which is 6 here, is the number of pole teeth of each stator pole. And, $d_t$ is a displaced pitch, and all other various coefficients not relevant to ν are determined to be 1 for simplification of the description.

FIG. 38 indicates the following. The harmonic component of torque increases or decreases with $d_p$ vibratingly. Therefore, by selecting an appropriate value $d_p$, the harmonic component of torque can be reduced compared with the case that no tooth is displaced. Especially, for the motor as a whole, the component appearing as the detent torque fundamentally is a harmonic component of the order 2PK$_e$ (where, P is the number of phases of the stepping motor, and $K_e$ is a positive integer), and other component cancel one another and do not appear. Therefore, when the two-phase motor has $d_p$ set to any of 0.063, 0.083, 0.167 and 0.188, the component of the order 4 can be made zero, and the detent torque can be lowered. However, the fundamental harmonic (the order 1) component which becomes main torque decreases with an increase in $d_p$. Therefore, $d_p$ is preferably selected to have a value as small as possible. That is, $d_p$=0.063 is suitable to make the fourth order component zero. However, the fundamental harmonic component decreases to 88% even in this case. It is to be noted that nonlinearity of the material is not taken into consideration here.

This phenomenon will be further described with reference to FIG. 39 showing the analytical result with the nonlinearity of the material taken into account. FIG. 39 shows the result of analyzing the flow of magnetic flux on the stator pole 21a and the rotor pole teeth 31 of the motor by means of a computer. FIG. 39 shows an example of the motor having the pole teeth 22 of the stator pole arranged with a uniform pitch, in which (a) shows that the centers of the pole teeth 31 of the rotor and the pole teeth 22 of the stator are aligned and the pole teeth 31 and 22 are opposed to each other, and (b) shows that the rotor has been turned by a ½ pitch from the position of (a), so that the pole teeth 31 and 22 are not opposed to each other. A main torque of the motor is proportional to an effective magnetic flux interlinking with the stator winding in the magnetic flux from the magnets. And the effective magnetic flux is indicated by a difference between the magnetic flux when the pole teeth are mutually opposed as shown in (a) and the magnetic flux when the pole teeth are not opposed as shown in (b). Therefore, the larger the difference of the magnetic flux between (a) and (b) is, the larger the main torque of the motor is.

FIG. 40 shows an example of the motor having the pole teeth displaced as shown in FIG. 37. Similar to FIG. 39, FIG.

40(a) shows that the centers of the pole teeth 31 of the rotor and the pole teeth 22d not displaced of the stator are aligned and the pole teeth 31 and 22d are opposed to each other, and FIG. 40(b) shows that the rotor has been turned by a ½ pitch from the position of (a), so that the pole teeth 31 and 22d are not opposed to each other. In FIG. 40, the magnetic flux is hard to flow in (a) while it is easy to flow in (b) by the influence of the pole teeth with their pitch displaced. As a result, the difference of the magnetic flux between (a) and (b) becomes small and lowers to 88% compared with the motor (FIG. 39) which has the pole teeth arranged with an equal pitch. This indicates the reduction of the main torque.

There was a problem of causing the decrease of the main torque when the detent torque was about to be decreased as described above, and an enough torque for practical use could not be obtained.

Accordingly, it is an object of the present invention to provide a hybrid stepping motor by displacing the pitch of any of the plurality of pole teeth formed on the stator pole of a stepping motor to effectively decrease the harmonic component of the detent torque so to suppress the vibration and noise when operating the motor and also the decrease of the fundamental harmonic (first order) component of the torque, thereby enabling to improve the torque performance.

DISCLOSURE OF THE INVENTION

The invention described in claim 1 relates to a stepping motor which comprises a stator having a plurality of stator poles and a rotor disposed to oppose the stator poles with a space therebetween, the rotor having rotor pole teeth disposed with predetermined pitch P1 and the stator poles having stator pole teeth opposed to the rotor pole teeth, wherein:

the stator poles are provided with n sets of tooth groups consisting of the stator pole teeth in the number of m, pitch P2 of the stator pole teeth in the tooth groups is in the following relation:

$$P2 \neq P1,$$

and pitch P3 of the tooth groups is in the following relations:

$$P3 \neq m \cdot P1$$

$$P3 \neq m \cdot P2$$

where, P1, P2 and P3 denote an electrical angle, and m and n are integers of 2 or more.

Thus, the stepping motor according to the present invention is configured to differ the pitch P2 of the stator pole teeth in the group of teeth from the pitch P1 of the rotor pole teeth in order to decrease harmonics and also to decrease the harmonics by the pitch P3 of the group of teeth, thereby decreasing the harmonic of more orders. The idea will be described as follows.

First, the pitch P2 of the stator pole teeth is different from the pitch P1 of the rotor pole teeth in the group of teeth of the stator pole, so that the harmonic of the order corresponding to this difference is decreased.

In addition, one set of tooth groups which consist of the stator pole teeth in number m can be assumed to be one pole tooth corresponding to the rotor pole teeth in number m. Therefore, since the pitch P3 of the tooth group is different from the pitch m·P1 of the rotor pole teeth in number m, the harmonic of the order corresponding to this difference is decreased, too.

When the pitch P3 of the tooth group is m times the pitch P2 of the stator pole teeth in the tooth group, the pitch of the stator pole teeth becomes constant over the plurality of tooth groups, and the boundary between the tooth group and the tooth group is lost. Therefore, the pitch P3 of the tooth group is made different from the m times the pitch P2 of the stator pole teeth in the tooth group.

Thus, according to the stepping motor of the present invention, the harmonic is decreased efficiently, and quieter and smoother rotation is obtained, because the harmonic of the more orders is decreased in one stator pole.

The invention described in claim 2 relates to the stepping motor according to claim 1, wherein the pitch P2 of the stator pole teeth in the tooth groups is in the following relation, $$P2 = P1\{1 \pm i/(m \cdot v)\},$$

and the pitch P3 of the tooth groups is in the following relation, $$P3 = P1\{m \pm i/(m \cdot v')\},$$

where, v and v' are the orders of a main harmonic, i is a positive integer which is not a multiple of m, and i' is a positive integer which is not a multiple of n.

It is generally known that when pitch PR of the rotor pole teeth and pitch PS of the stator pole teeth are in the relation of PS=PR{1±1/(m·v)}, a plurality of harmonics which contain the order v are decreased.

The harmonics of the individual orders are respectively shown in the sine wave of a given cycle, so that the displacement of such stator pole teeth can be i times (i is a positive integer which is not the multiple of m) the {PR/(m·v)}.

Therefore, the present invention has summarized the structure based on the above into the structure of claim 1.

That is, the plurality of harmonics which contain the order v are decreased because the pitch P2 of the stator pole teeth in the tooth group is in the relation of P2=P1{1±i/(m·v)} with respect to the pitch P1 of the rotor pole teeth.

When the pitch P3 of the tooth group is in the relation of P3=m·P1{1±i'/(n·v')} with respect to pitch m·P1 of the rotor pole teeth of the number m, the plurality of harmonics which contain the order v' are decreased. Here, the displacement of the pitch of the tooth group to the rotor pole teeth of the number m can be (1/m) because the harmonic produced in the tooth group can be decomposed for each of the stator pole teeth of the number m.

Therefore, its expression is indicated as follows:

$$P3 = m \cdot P1(1 \pm i'/n \cdot v' \cdot m)$$

$$P3 = P1(m \pm i'/n \cdot v')$$

Thus, the plurality of harmonics which contain the orders v and v' can be decreased by the stepping motor of the present invention.

If the harmonics of the orders 4 and 6 are to be decreased, the pitch P2 of the stator pole teeth in the tooth group and the pitch P3 of the tooth group are set by substituting v=4 and v'=6 or v=6 and v'=4 for the above expressions.

In this case, the values of i and i' are determined arbitrarily.

The invention described in claim 3 is a stepping motor according to claim 1 or 2, wherein the stepping motor is a three-phase motor which has at least the fourth order harmonic and the sixth order harmonic lowered.

Thus, the stepping motor according to the present invention is, in claim 1 or 2, wherein a three-phase motor which has at least the fourth order and sixth order harmonics decreased, so that the fourth order and sixth order harmonics can be decreased in one stator pole.

Specifically, a particular problem involved in the three-phase motor is conventionally assumed to be the sixth order harmonic, and the pitch of the stator pole teeth is determined according to the aforesaid conditions. In practice, however, in order to obtain the effects by the layouts between the phases and between the stator poles, the accuracy in the motor parts manufacturing and assembling processes was extremely strictly restricted, and it was very difficult to achieve satisfactory quietness. But, the present invention has remedied such disadvantages by decreasing the fourth order and sixth order harmonic in one stator pole.

The invention described in claim 4 relates to a three-phase stepping motor which comprises a stator having a plurality of stator poles and a rotor disposed to oppose the stator poles with a space therebetween, the rotor having rotor pole teeth disposed with a predetermined pitch PR and the stator poles having stator pole teeth opposed to the rotor pole teeth, wherein:

the stator poles are provided with the stator pole teeth in the number of m, pitch PS of the stator pole teeth is in the following relations:

$$PS=PR\{1\pm i/(m\cdot 4)\},$$

and $$PS=PR\{1\pm i'/(m\cdot 6)\},$$

where, i and i' are positive integers which are not a multiple of m.

Thus, the stepping motor of the present invention has the fourth order and sixth order harmonics decreased.

Specifically, when the harmonic to be decreased is assumed to be ν, it is satisfactory if the following relation is met:

$$PS=PR\{1\pm i/(m\cdot \nu)\},$$

and a relation that the fourth order harmonic can be decreased is determined by substituting ν=4 for the above expression.

When pitch PS of the stator pole teeth calculated from the above relation also has the following relation, $$PS=PR\{1\pm i'/(m\cdot 6)\}$$

even the sixth order harmonic can be decreased, so that the relation that the fourth order and sixth order harmonics are decreased is determined by properly setting i and i'.

According to the above expressions, i and i' are expressed as follows, $$i/(m\cdot 4)=i'/(m\cdot 6)$$

$$i/2=i'/3$$

and can be any values satisfying the above relations.

The invention described in claim 5 relates to a stepping motor which comprises a stator having a plurality of stator poles and a rotor disposed to oppose the stator poles with a space therebetween, the plurality of stator poles being provided with stator pole teeth, and the rotor being provided with rotor pole teeth, wherein the rotor has two rotor cores with different phases of the rotor pole teeth, and the stator and one of the rotor cores as well as the stator and the other rotor core have a plurality of layers with different tooth widths of either or both of the stator pole teeth and the rotor pole teeth in a direction of the rotation axis of the rotor.

Thus, according to the stepping motor of the present invention, the rotor has two rotor cores with different phases of the rotor pole teeth, the stator and one of the rotor cores as well as the stator and the other rotor core have a plurality of layers with different tooth widths of one or both of the stator pole tooth and the rotor pole tooth in the direction of the rotation axis of the rotor, so that waveforms of detent torque produced between one stator pole tooth and the rotor pole tooth of one of the rotor cores as well as between one stator pole tooth and the rotor pole tooth of the other rotor core is approximated to sine wave by combining the detent torques of the respective layers. As a result, these detent torques cancel one another accurately to reduce undesired vibration and noise due to the detent torque.

Especially, harmonics were conventionally cancelled by a pair of stator pole teeth by properly determining a pitch of each pole tooth, but it was not satisfactory because of an influence of magnetic imbalance due to eccentricity, falling or the like of the rotor against the stator. On the other hand, according to the present invention, the waveform of the detent torque is approximated to the sine wave by combining the detent torques of the individual layers, so that an influence of the magnetic imbalance due to the eccentricity, falling or the like of the rotor to the stator is avoided, and an undesired increase of the detent torque is suppressed.

The invention described in claim 6 relates to a stepping motor according to claim 5, wherein the plurality of layers with different tooth widths comprise at least three layers.

Thus, according to the stepping motor of the present invention, a plurality of layers with different tooth widths include at least three layers, so that the detent torque of one stator pole tooth is further approximated to the sine wave.

The invention described in claim 7 relates to a stepping motor according to claim 6, wherein a tooth width ratio of the rotor pole teeth is uniform along a direction of the rotation axis of the rotor, the stator and the rotor cores have a layer of 0.25 to 0.29, a layer of 0.33 to 0.35 and a layer of 0.40 to 0.42 in the average of the tooth width ratio of the stator pole teeth and the tooth width ratio of the rotor pole teeth.

In the stepping motor of the present invention, when the rotor pole teeth have a uniform tooth width ratio along a direction of the rotation axis of the rotor, and the stator and the rotor core have the layer of 0.25 to 0.29, the layer of 0.33 to 0.35 and the layer of 0.40 to 0.42 in the average between the tooth width ratio of the stator pole tooth and the tooth width ratio of the rotor pole tooth, it was experimentally confirmed that a ratio of a harmonic component contained in the detent torque can be made relatively small. Specifically, when the tooth width ratio is determined within the aforesaid ranges, a distortion in the waveform of the detent torque due to the harmonic can be reduced securely.

The invention described in claim 8 relates to a stepping motor according to any of claims 5 through 7, wherein the plurality of layers having the different tooth widths of the stator and the two rotor cores are symmetrically disposed in the direction of the rotation axis of the rotor.

Thus, with the stepping motor of the present invention, the plurality of layers having different tooth widths on the stator and the two rotor cores are symmetrically disposed toward the direction of the rotation axis of the rotor, so that stability of supporting the rotor is secured.

Specifically, when the layers having different tooth widths are laminated, different torque is produced in each layer when the motor is driven, and a balance of supporting the rotor may be degraded. But the present invention can prevent such a situation.

The invention described in claim 9 relates to a stepping motor according to any of claims 1 through 4, wherein at least one pole tooth among the pole teeth of the stator pole is provided with a slanted portion.

The invention described in claim 10 relates to a stepping motor according to any of claims 5 through 8, wherein at least one pole tooth among the pole teeth of the stator pole is displaced to have a different pitch from the other teeth, and a slanted portion is formed on at least one of the displaced pole teeth, by cutting the leading end thereof to have a different shape from the other pole teeth.

Thus, when the shapes of the pole teeth are determined as described above, a fundamental harmonic (first order) component of the torque can be increased by changing easiness of flowing magnetic flux. As a result, the harmonic component of the detent torque can be decreased effectively, vibration and noise during the operation can be suppressed, and lowering of the main torque is suppressed, so that the torque performance can be improved.

Here, when the shapes of the pole teeth are changed, gap permeance changes, but the gap permeance can be kept constant by increasing the tooth width by a level corresponding to the change. But, a width of the dedendum is different between the pole tooth having a different shape and the pole tooth not having a different shape.

Therefore, the invention described in claim 11 relates to a stepping motor according to claim 10, wherein the slanted portion is also formed on the non-displaced pole teeth by cutting off their leading ends so to have the same width at all the dedendums.

Thus, the fundamental harmonic (first order) component of torque can be increased even when the shape of the pole tooth is determined. As a result, vibration and noise during operation can be suppressed, and the torque performance can be improved at the same time.

The invention described in claim 12 relates to a printing device characterized in that the stepping motor according to any of claims 1 through 11 is used as a drive motor for a printhead.

The invention described in claim 13 relates to a paper-feed device, wherein the stepping motor according to any of claims 1 through 11 is used as a drive motor for a paper-feed roller.

The invention described in claim 14 relates to a printer, characterized by using the device according to claim 12 or 13.

The stepping motor of the present invention rotates more quietly and smoothly and its positioning accuracy is also improved. Therefore, it is suitable for office equipment, and particularly for a printing device and a paper-feeding device of a printer.

BRIEF DESCRIPTION OF THE DRAWINGS

FIG. 23 is a diagram showing a result of analyzing a flow of magnetic flux of a motor according to the invention;

FIG. 26 is a diagram showing a result of analyzing a flow of magnetic flux of a motor according to another embodiment of the invention;

FIG. 39 is a diagram showing a result of analyzing a flow of magnetic flux of conventional motor; and FIG. 40 is a diagram showing a result of analyzing a flow of magnetic flux of another conventional motor.

BEST MODE FOR CARRYING OUT THE INVENTION

Now, embodiments of the invention will be described in detail with reference to the accompanying drawings.

Figure 1:
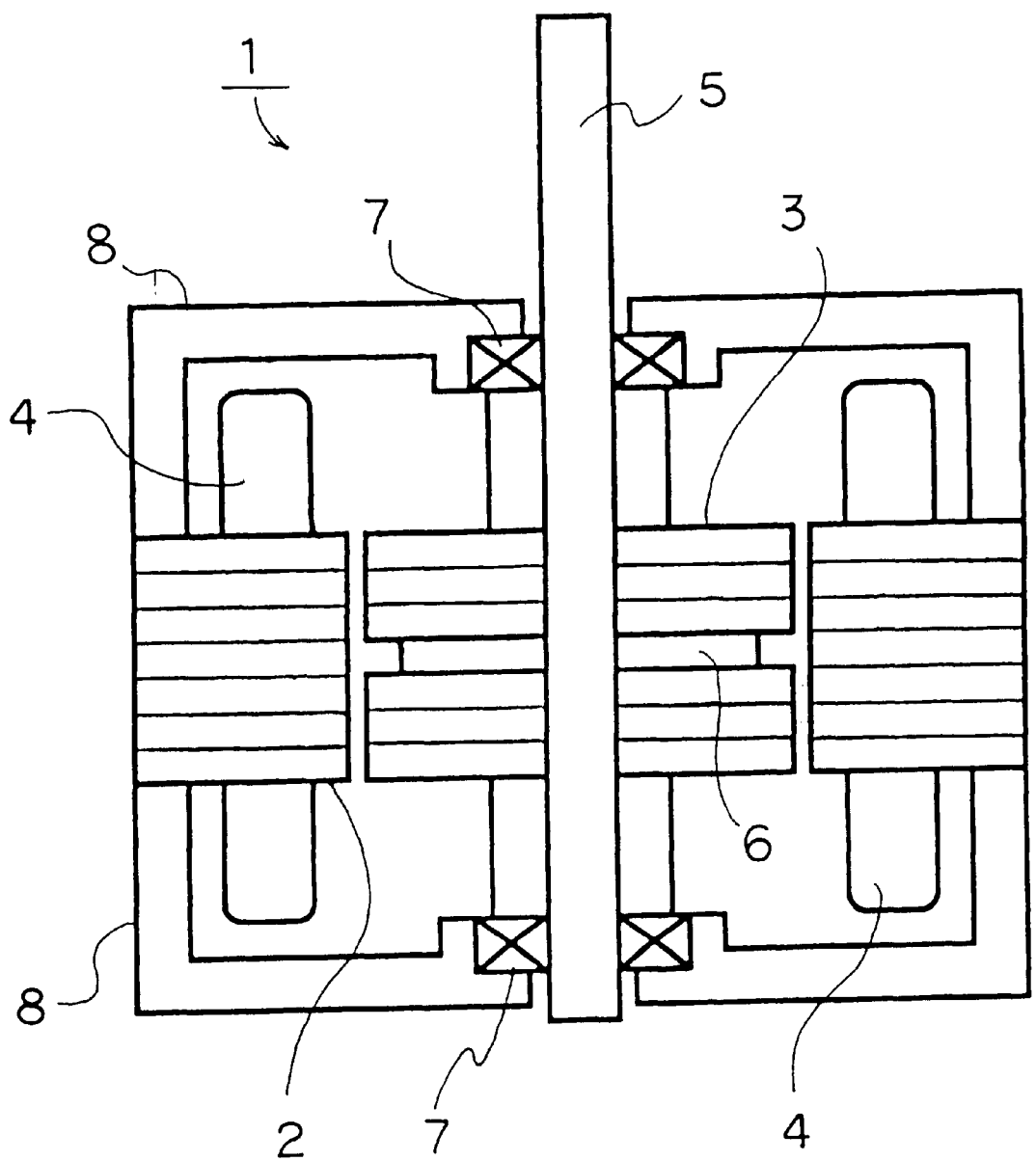
FIG. 1 is a side sectional view showing a stepping motor according to an embodiment of the invention.
Figure 2:
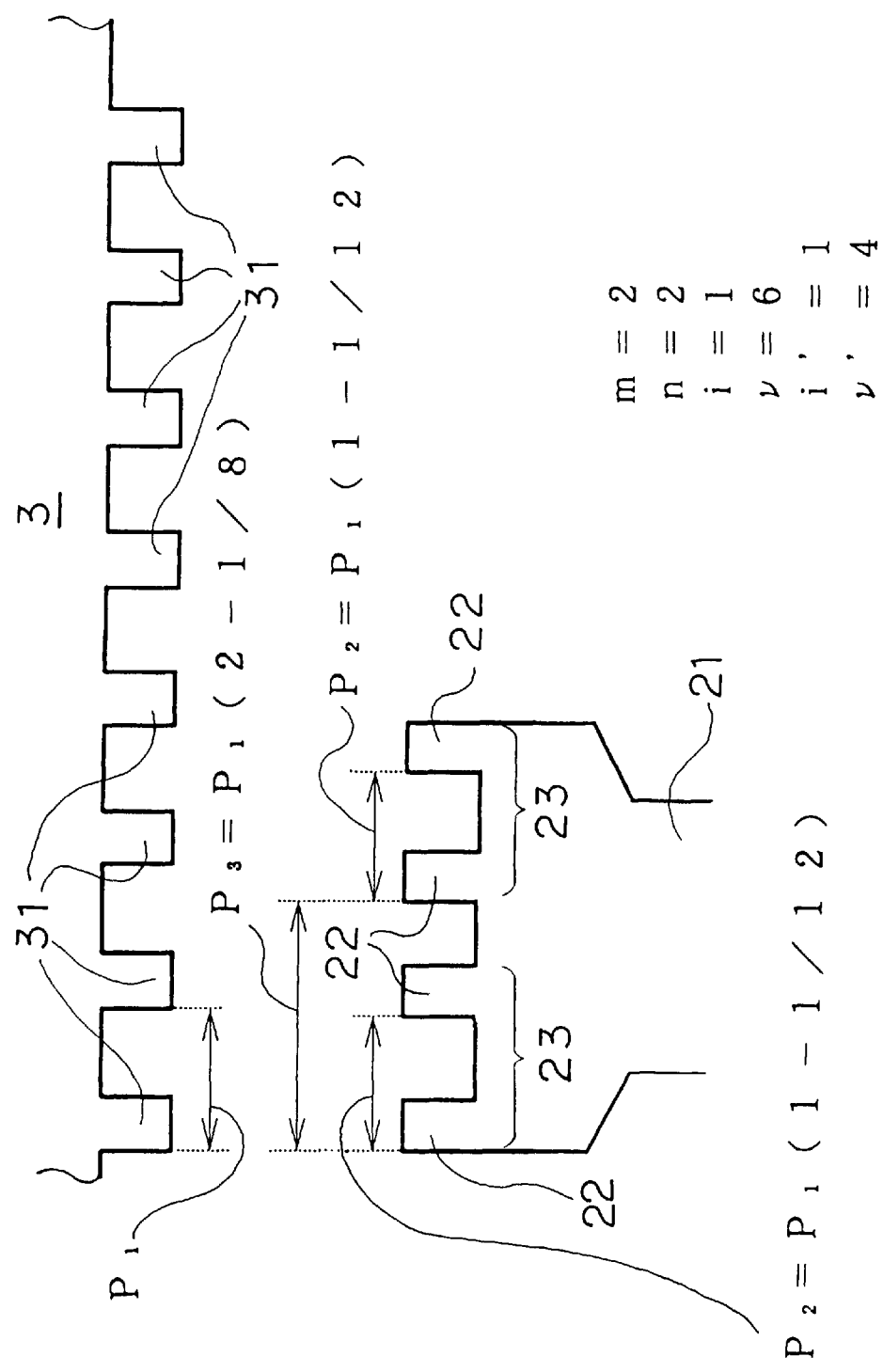
FIG. 2 is an explanatory diagram showing rotor pole teeth and stator pole teeth according to the embodiment of the invention.

As shown in FIGS. 1 and 2, a stepping motor 1 of this embodiment is a three-phase motor which has a stator 2 which is cylindrical and having six stator poles 21 arranged at predetermined intervals therein, a rotor 3 arranged within the stator 2, a stator coil 4 which is disposed on each of the plurality of stator poles 21, an output axis 5 which is a rotation axis of the rotor 3, and a disk permanent magnet 6 disposed in a required position of the rotor 3. It is configured to produce torque on the output axis 5 by exciting the respective stator coils 4. In FIG. 1, 7 is a bearing of the output axis 5, and 8 is a bracket for supporting the stator 2 and the bearing 7.

Figure 29:
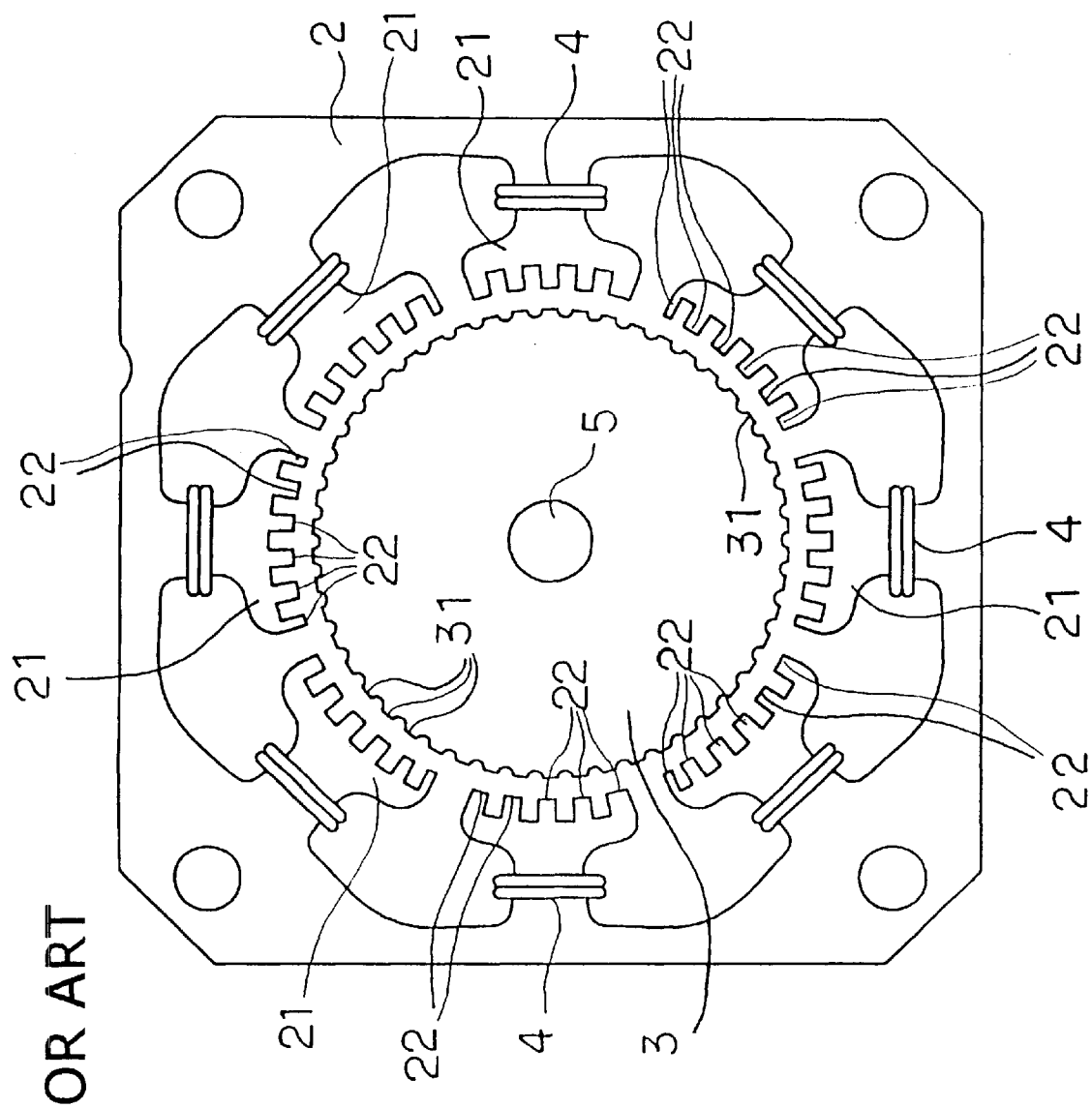
FIG. 29 is a cross sectional view showing a basic structure of a stator and a rotor according to prior art.
Figure 30:
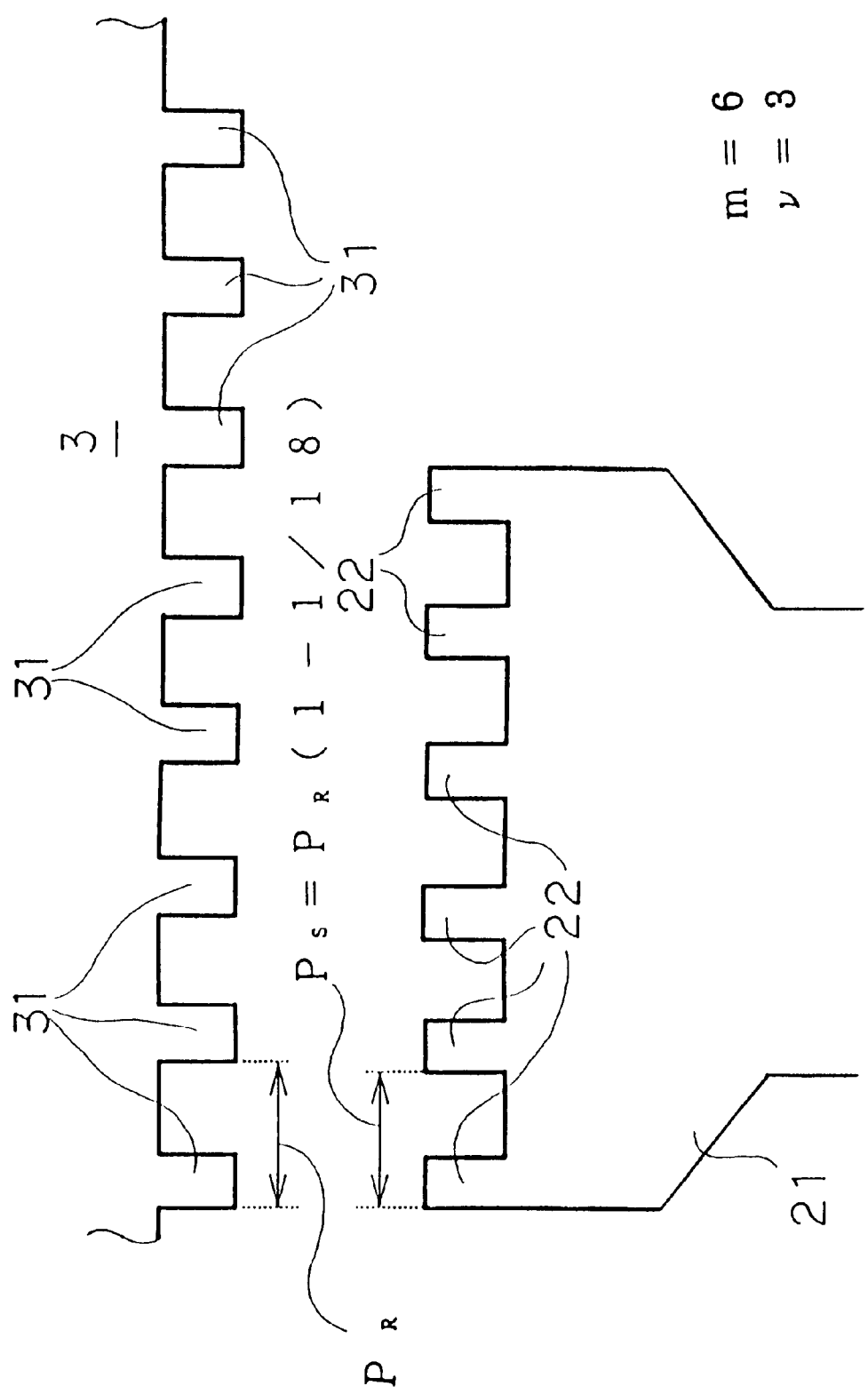
FIG. 30 is an explanatory diagram showing rotor pole teeth and stator pole teeth according to prior art.

Stator pole teeth 22 are arranged at predetermined intervals on the leading ends of the stator pole 21, and rotor pole teeth 31 are arranged at predetermined intervals on the outer periphery of the rotor 3. The basic structures of the stator pole teeth 22 and the rotor pole teeth 31 are common to the one shown in FIG. 29 described above. Therefore, the same reference numerals are used, and their drawings are omitted.

As shown in the drawings, the rotor 3 of this embodiment has 26 rotor pole teeth 31 disposed with a given pitch P1.

Each stator pole 21 is provided with two pairs of tooth groups 23 consisting of two stator pole teeth 22, pitch P2 of the stator pole teeth 22 in each tooth group 23 is determined to be P1(1−1/12), and pitch P3 of the tooth group 23 is determined to be P1(2−1/8). Here, P1, P2 and P3 denote an electrical angle.

Specifically, in order to reduce the fourth order harmonic and the sixth order harmonic, m=2, n=2, v=6, v'=4 and arbitrary values i=1, i'=1 to be any values are substituted for the aforesaid expressions to determine as follows:

$$P2=P1\{1-1/(2\times 6)\}$$

$$P2=P1(1-1/12)$$

and $$P3=P1\{2-1/(2\times 4)\}$$

$$P3=P1(2-1/8)$$

And, since m·P2=P1(2−1/6), the following is established.

$$P3 \neq m \cdot P2$$

Figure 3:
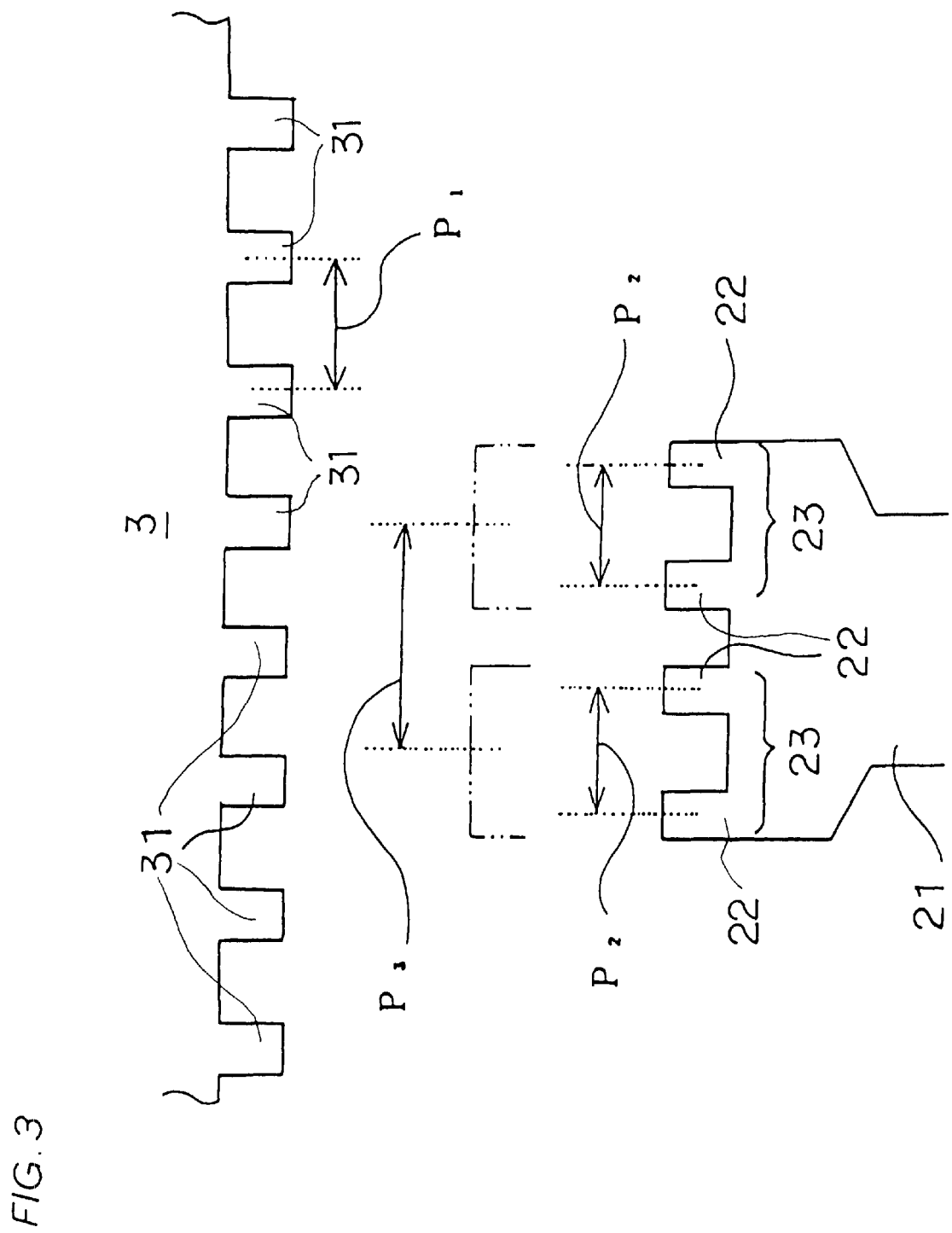
FIG. 3 is an explanatory diagram showing rotor pole teeth and stator pole teeth according to the embodiment of the invention.

Pitch P1 of the rotor pole teeth 31, pitch P2 of the stator pole teeth 22 within the tooth group 23 and pitch P3 of the tooth group 23 are indicated according to their projections and depressions in FIG. 2 but may be indicated to show from the center to the center of the adjacent rotor pole teeth 31, stator pole teeth 22 or tooth group 23, as shown in FIG. 3.

Figure 4:
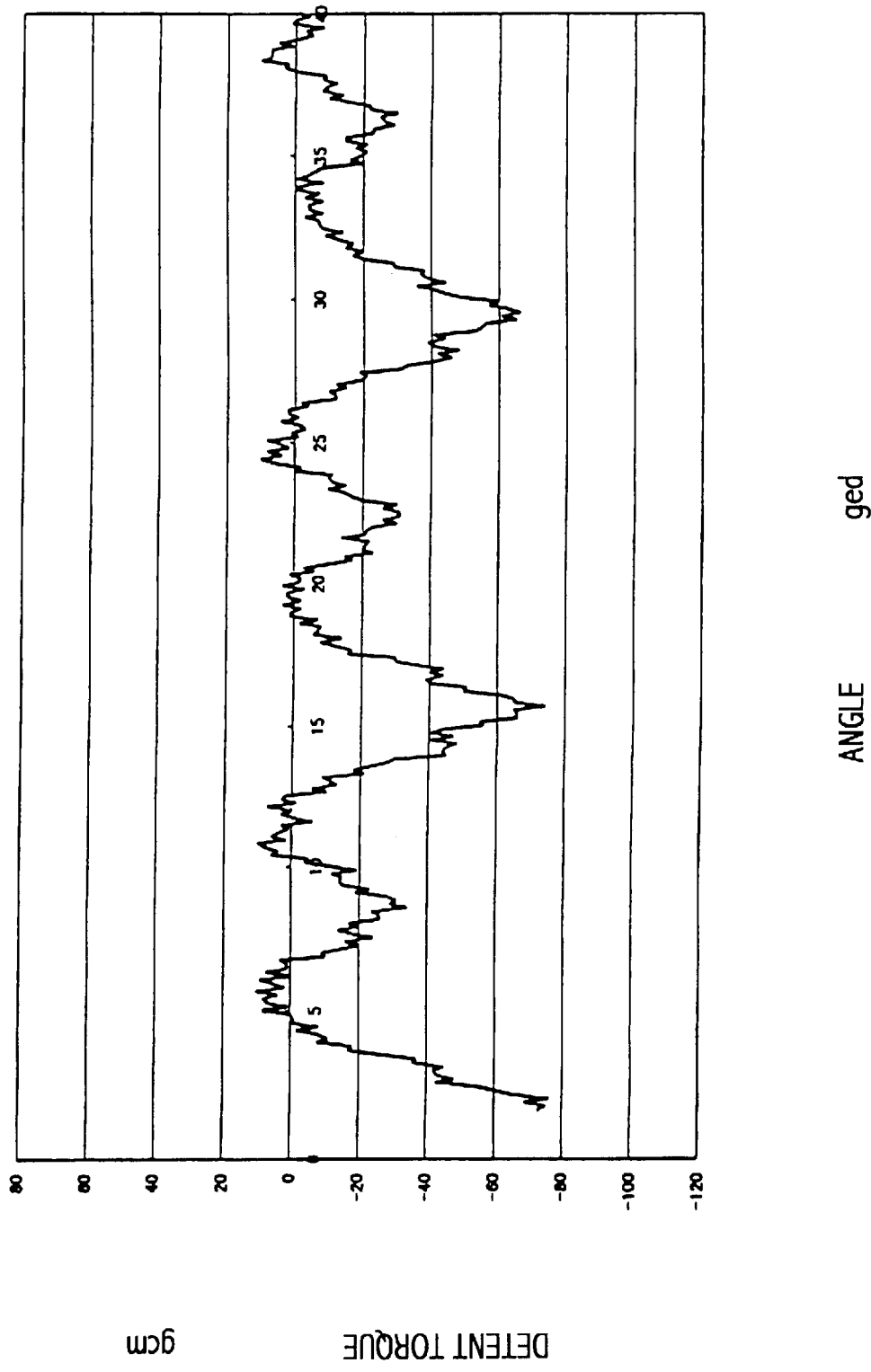
FIG. 4 is a schematic diagram showing a result of measuring detent torque according to the embodiment of the invention.

The detent torque property of the stepping motor 1 of this embodiment was measured, and the obtained result is shown in FIG. 4.

Figure 5:
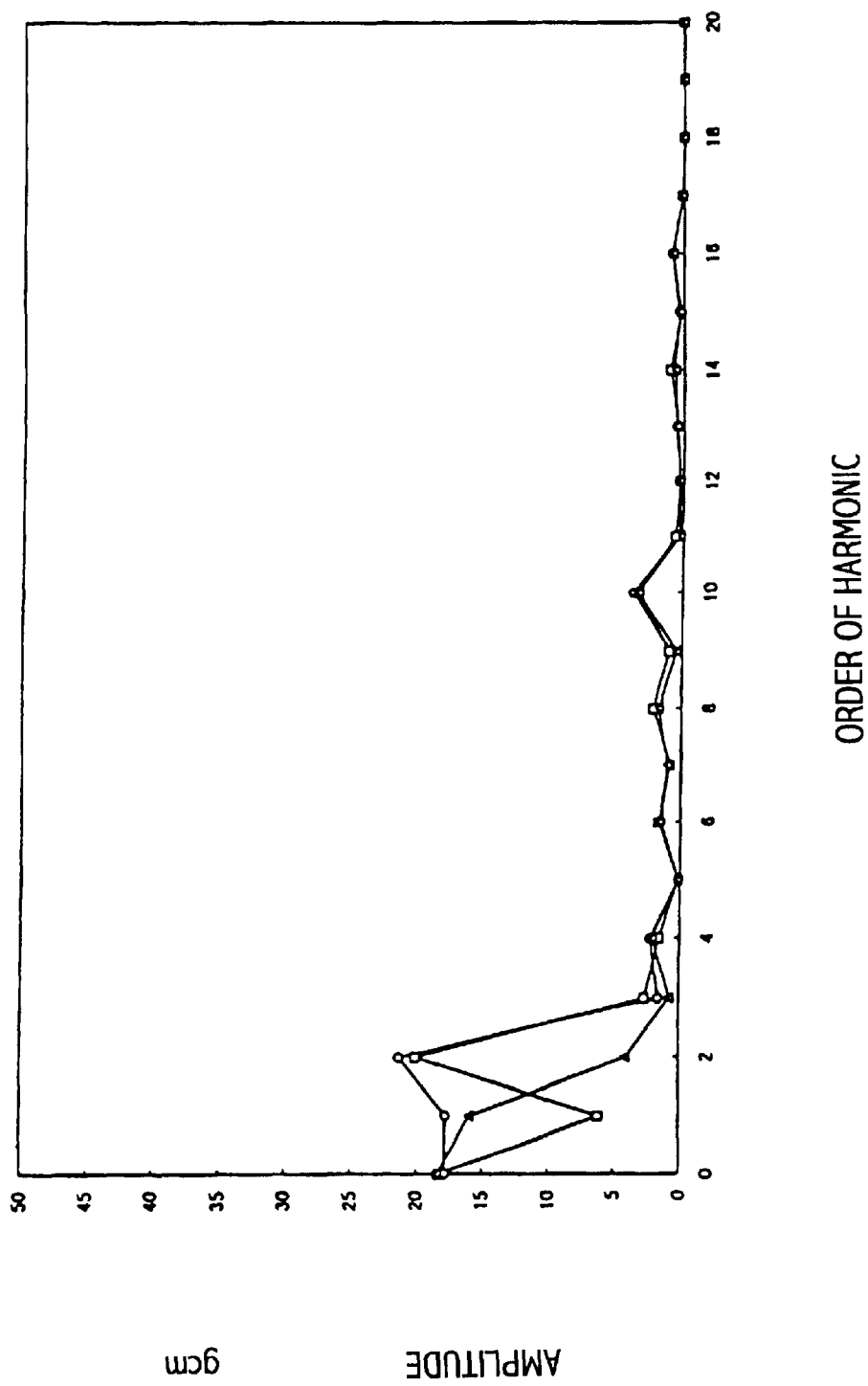
FIG. 5 is a schematic diagram showing a result of frequency analysis of the order of harmonic according to the embodiment of the invention.

Besides, the same measurement was repeated on a plurality of motors produced for trial, and frequency analysis was made on the order of the harmonic for the detent torque property. The results obtained are shown in FIG. 5.

Figure 33:
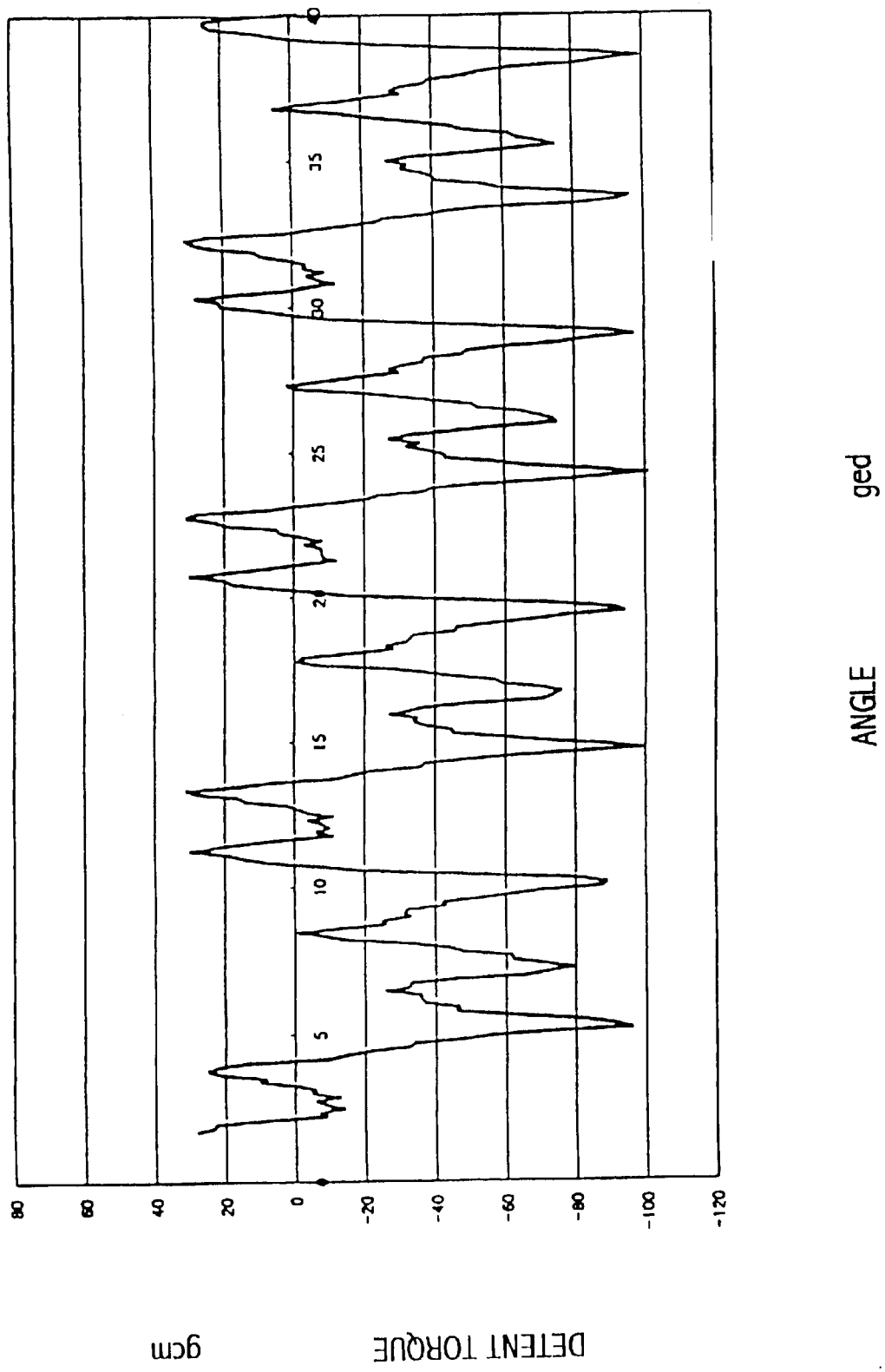
FIG. 33 is a schematic diagram showing a result of measuring detent torque according to prior art.
Figure 34:
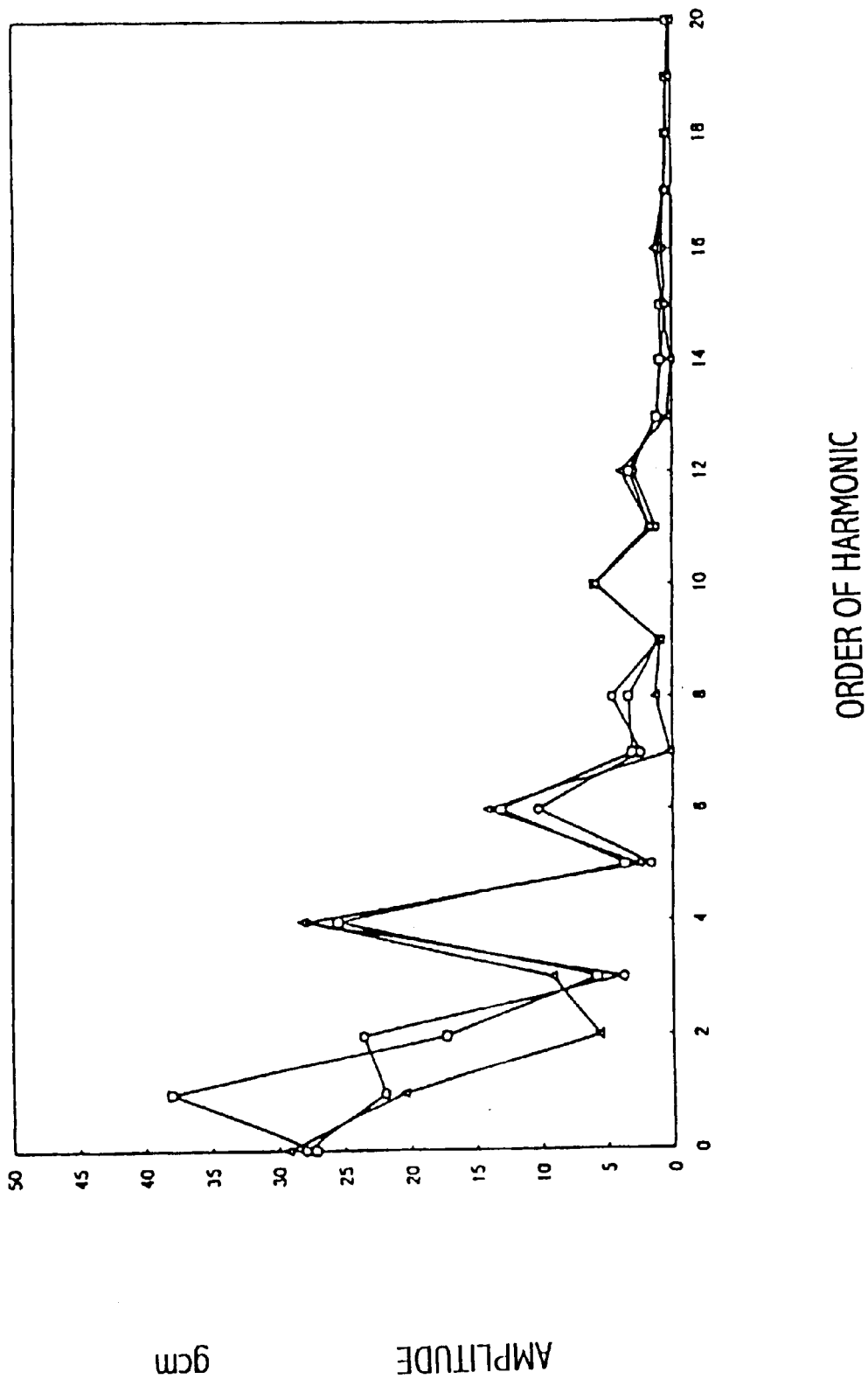
FIG. 34 is a schematic diagram showing a result of frequency analysis of the order of harmonic according to prior art.
Figure 35:
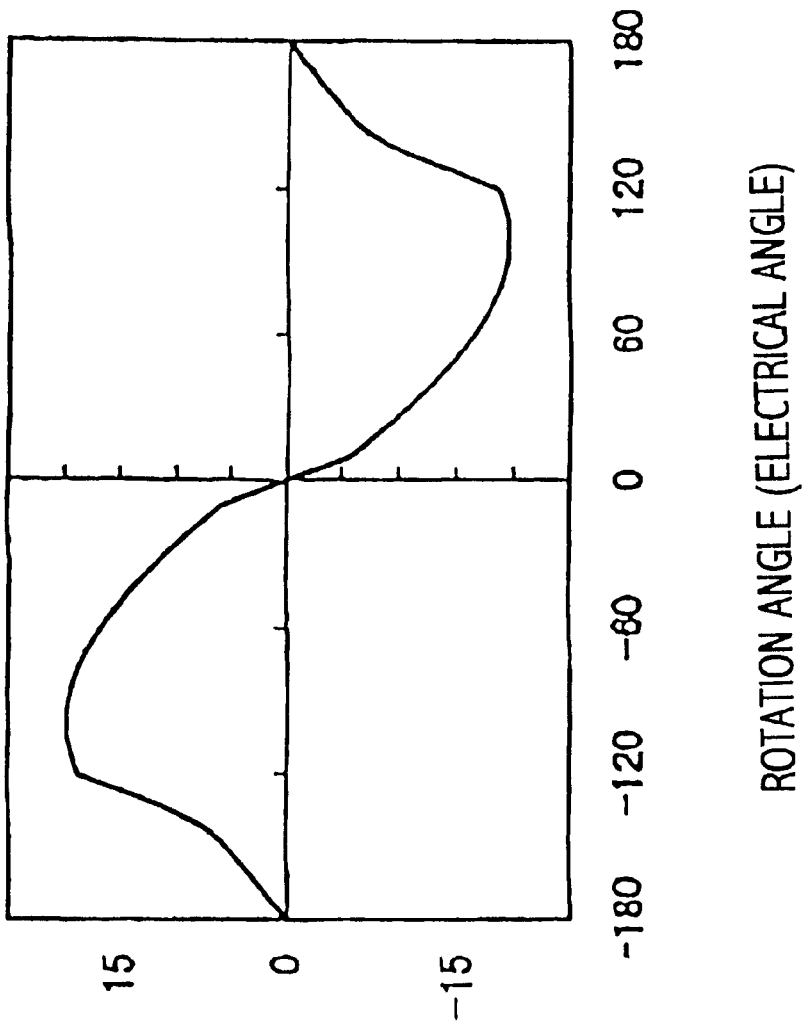
FIG. 35 is a diagram showing detent torque property produced between one stationary pole tooth and a rotor pole tooth according to prior art.
Figure 36:
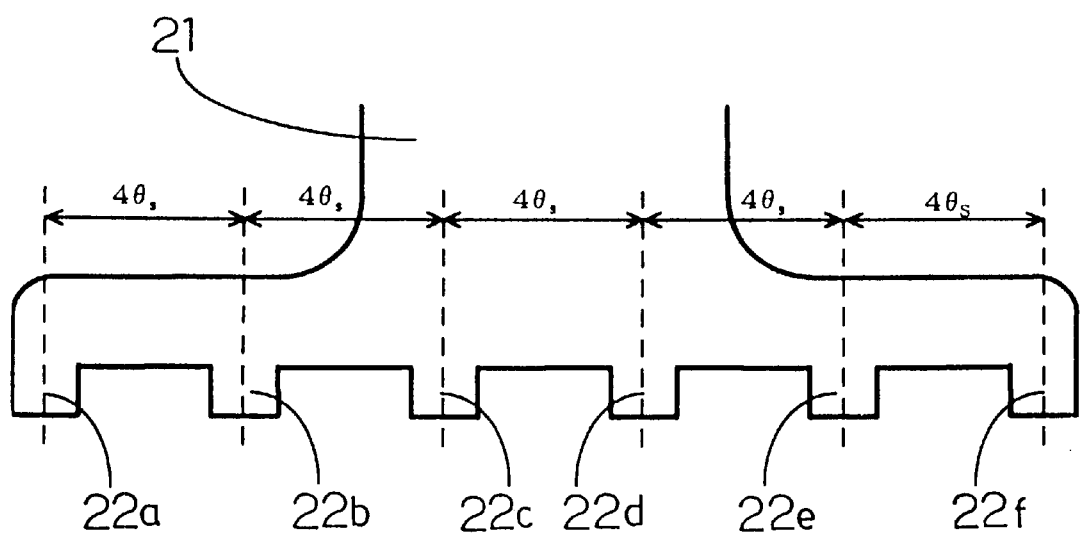
FIG. 36 is a developed diagram showing a shape and a mutual positional relation of pole teeth of a conventional motor.
Figure 37:
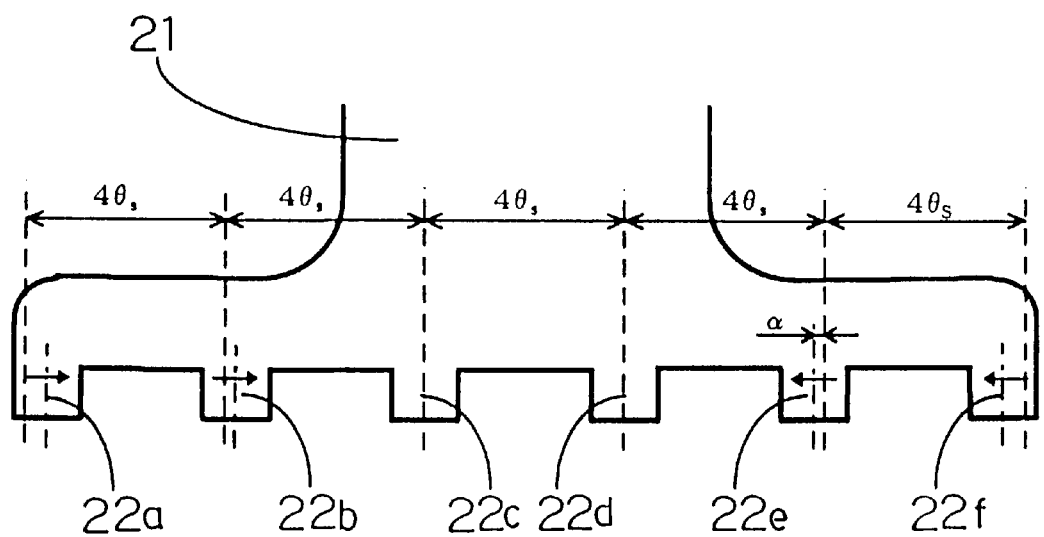
FIG. 37 is a developed diagram showing a shape and a mutual positional relation of pole teeth of another conventional motor.
Figure 38:
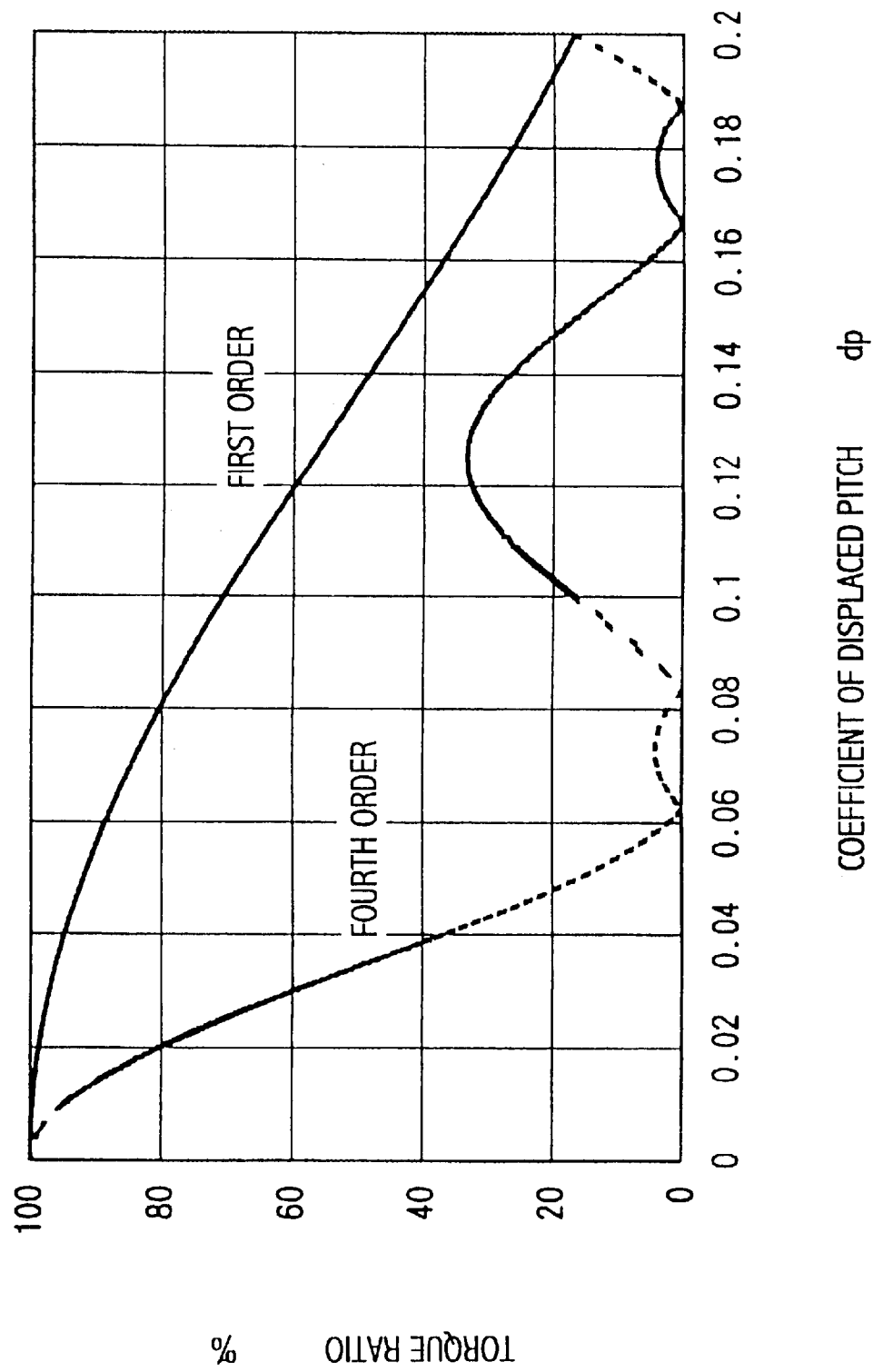
FIG. 38 is a graph showing a relation between torque and a deviation of pole teeth of conventional motor.

The results of this embodiment shown in FIGS. 3 and 4 were compared with the results (see FIGS. 33 and 34) of a conventional three-phase motor having the pitch of the stator pole teeth and the pitch of the rotor pole teeth which are equal, and it was confirmed that the fourth order harmonic, the sixth order harmonic and other harmonics were remarkably decreased.

Figure 31:
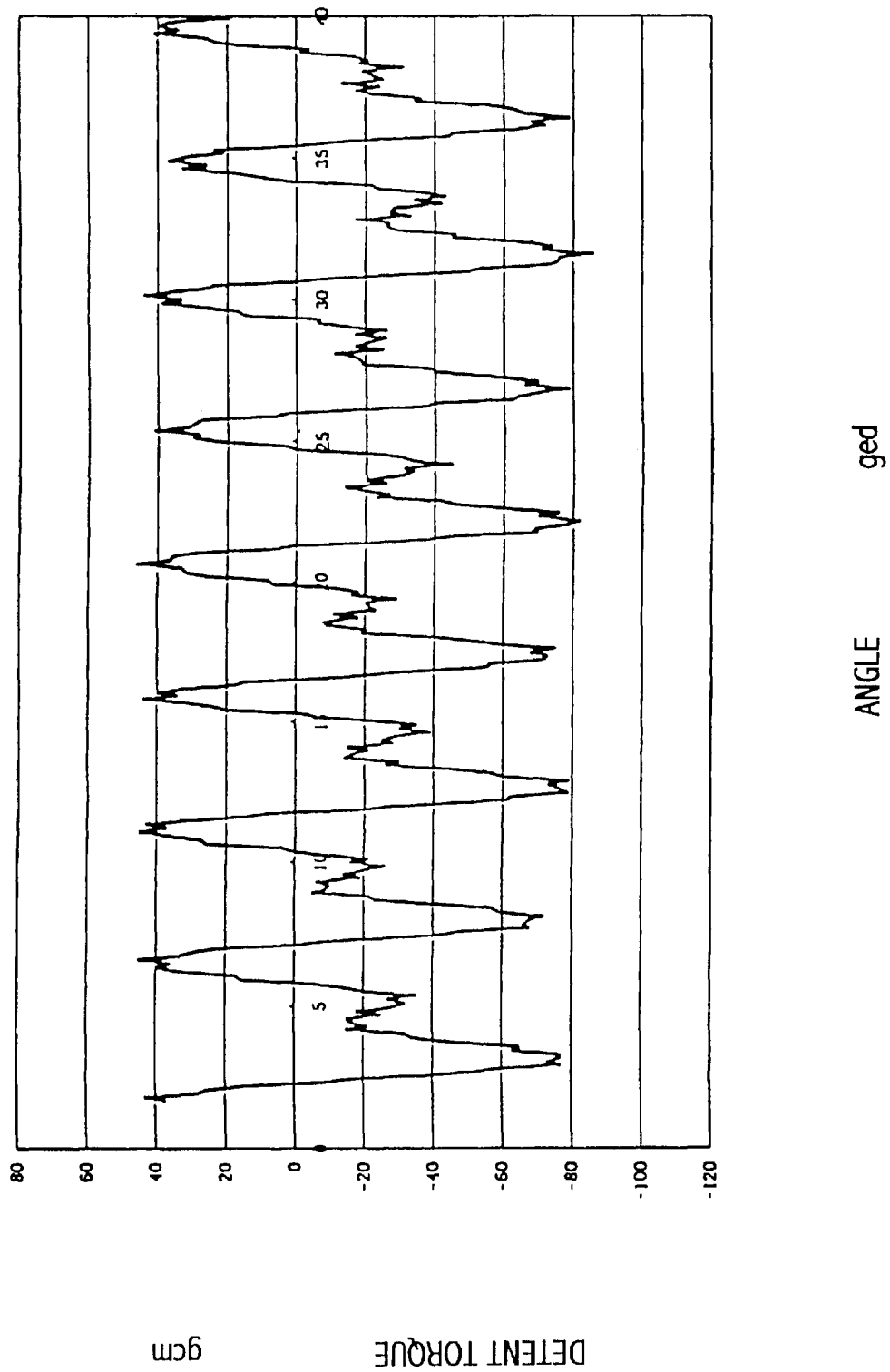
FIG. 31 is a schematic diagram showing a result of measuring detent torque according to prior art.
Figure 32:
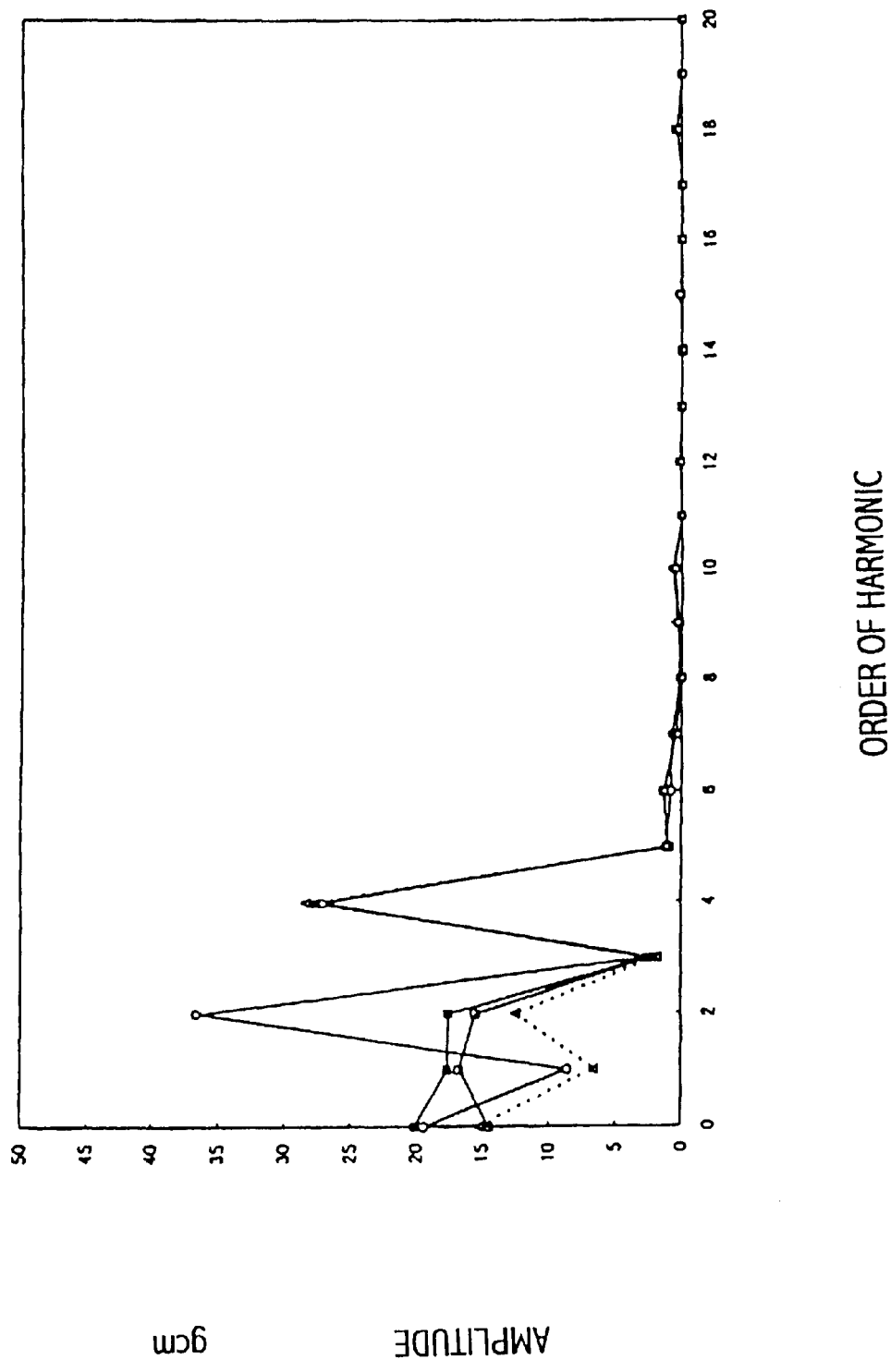
FIG. 32 is a schematic diagram showing a result of frequency analysis of the order of harmonic according to prior art.

When the results of this embodiment were compared with the results (see FIGS. 31 and 32) of the conventional three-phase motor which had the pitch of the stator pole teeth determined on the basis of the relation PS=PR{1±1/(m·v)}, it was confirmed that the fourth harmonic was especially decreased.

Thus, by the stepping motor of this embodiment, harmonics of much more orders can be decreased in a single stator pole, so that the harmonic is efficiently decreased, and quieter and smoother rotations can be obtained.

Specifically, the special problem of the three-phase motor was conventionally said to be the sixth order harmonic, and the pitch of the stator pole teeth is determined according to such conditions. But, when an effect by a layout between phases or between stator poles is tried to be achieved, the motor parts manufacturing and assembling steps are quite strictly restricted in terms of accuracy, and it is very hard to achieve satisfactory quietness. The present embodiment, however, can avoid such disadvantages because the fourth order harmonic and the sixth order harmonic are decreased by a single stator pole.

Figure 6:
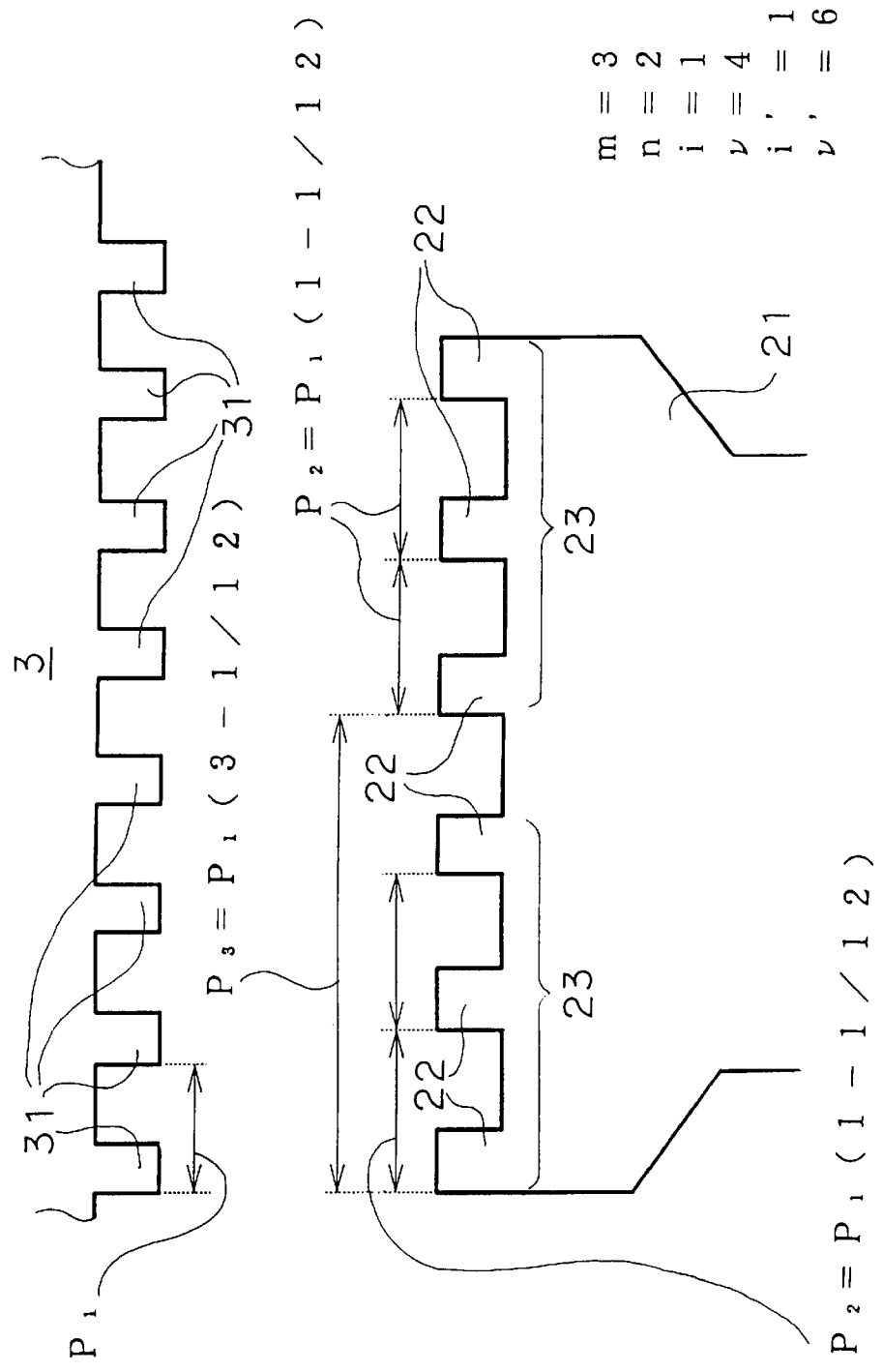
FIG. 6 is an explanatory diagram showing rotor pole teeth and stator pole teeth according to another embodiment of the invention.

Now, another embodiment of the invention will be described with reference to FIGS. 6, 7 and 8.

In this embodiment, the rotor 3 which has 38 rotor pole teeth 31 with predetermined pitch P1 is used, the pole tooth stator pole 21 is provided with two sets of tooth groups 23 consisting of three stator pole teeth 22, and the harmonic is decreased by setting the pitch P2 of the stator pole teeth 22 in the tooth group 23 and pitch P3 of the tooth group 23. The other structure is the same as in the aforesaid embodiment, so that the same reference numerals are applied to the common parts, and their descriptions are omitted.

To decrease the fourth order harmonic and the sixth order harmonic in this embodiment, m=3, n=2, v=4 and v'=6, and any values i=1 and i'=1 are substituted for the aforesaid expressions to determine the following expressions:

$$P2=P1\{1-1/(3\times 4)\}$$

$$P2=p1(1-1/12)$$

and $$P3=P1\{3-1/(2\times 6)\}$$

$$P3=P1(3-1/12)$$

And, since m·P2=P1(3−¼),
P3≠m·P2 is established.

Figure 7:
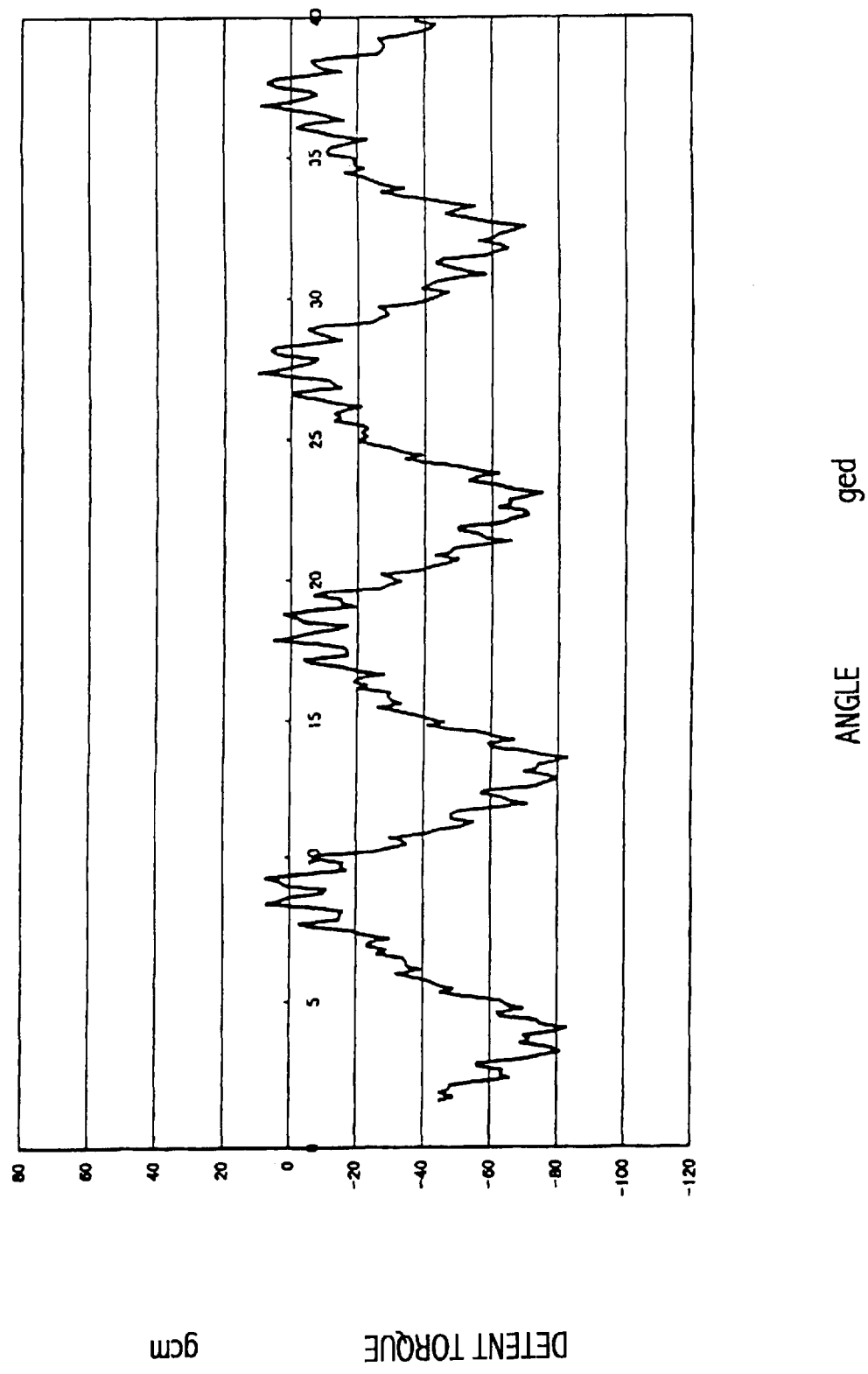
FIG. 7 is a schematic diagram showing a result of measuring detent torque according to the embodiment of the invention.

The detent torque property was measured in this embodiment, and the results obtained are as shown in FIG. 7.

Figure 8:
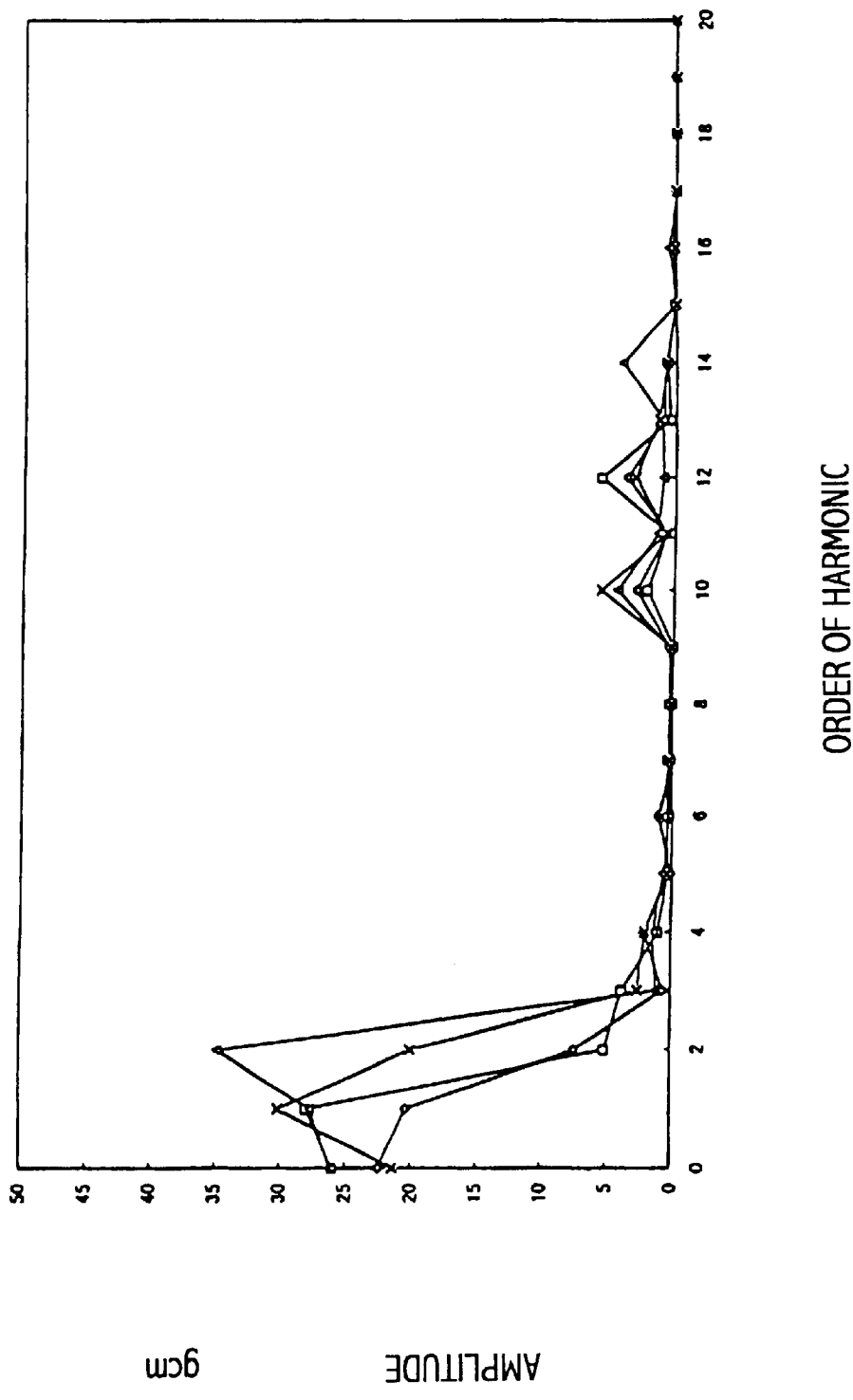
FIG. 8 is a schematic diagram showing a result of frequency analysis of the order of harmonic according to the embodiment of the invention.

Besides, the same measurement was repeated on a plurality of motors produced for trial, and frequency analysis was made on the order of the harmonic for the detent property, and the results obtained are shown in FIG. 8.

As shown in the drawings, it was confirmed that the fourth order harmonic, the sixth order harmonic and other harmonics were remarkably decreased in this embodiment.

Figure 9:
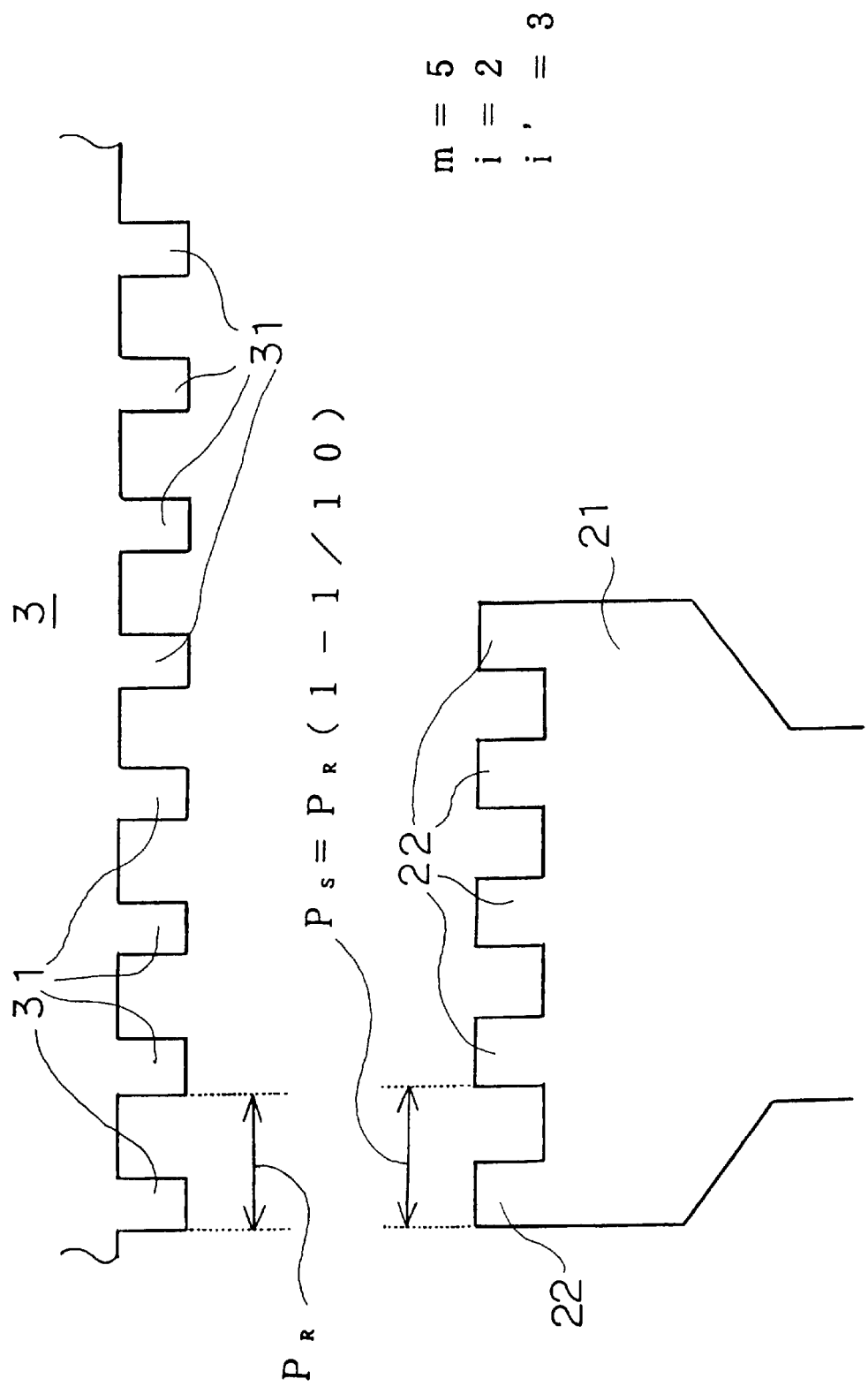
FIG. 9 is an explanatory diagram showing rotor pole teeth and stator pole teeth according to another embodiment of the invention.

Another embodiment of the invention will be described with reference to FIGS. 9, 10 and 11.

The stepping motor of this embodiment has a three-phase structure using the rotor 3 having 32 rotor pole teeth 31 and the stator 2 having six stator poles 21, and each stator pole 21 is provided with five stator pole teeth 22.

In this embodiment, pitch PS of the stator pole teeth 22 is set to relate to pitch PR of the rotor pole teeth 31 as follows.

$$PS=PR(1-1/10)$$

Specifically, in order to decrease the fourth order harmonic and the sixth order harmonic, the following relations should be met:

$$PS=PR\{1\pm i/(m\cdot 4)\}$$

and $$PS=PR\{1\pm i'/(m\cdot 6)\}.$$

Therefore, the aforesaid relation is determined by substituting m=5, i=2 and i=3 for the above expressions.

Since i and i' are positive integers which are not multiples of five and determined to satisfy the following relation:

$$i/2=i'/3.$$

Figure 10:
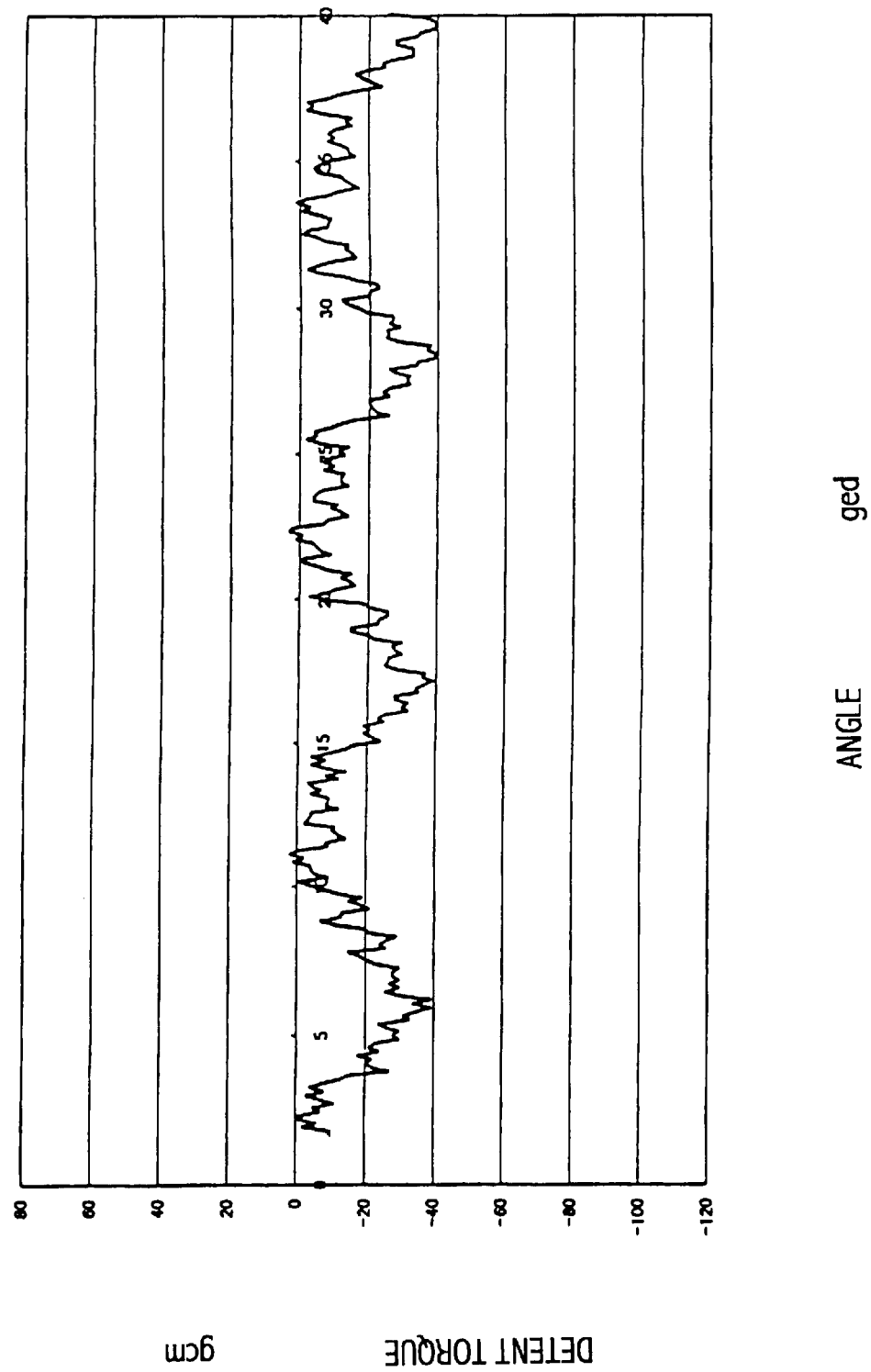
FIG. 10 is a schematic diagram showing a result of measuring detent torque according to the embodiment of the invention.

And, the detent torque property was measured in this embodiment, and the result obtained is as shown in FIG. 10.

Figure 11:
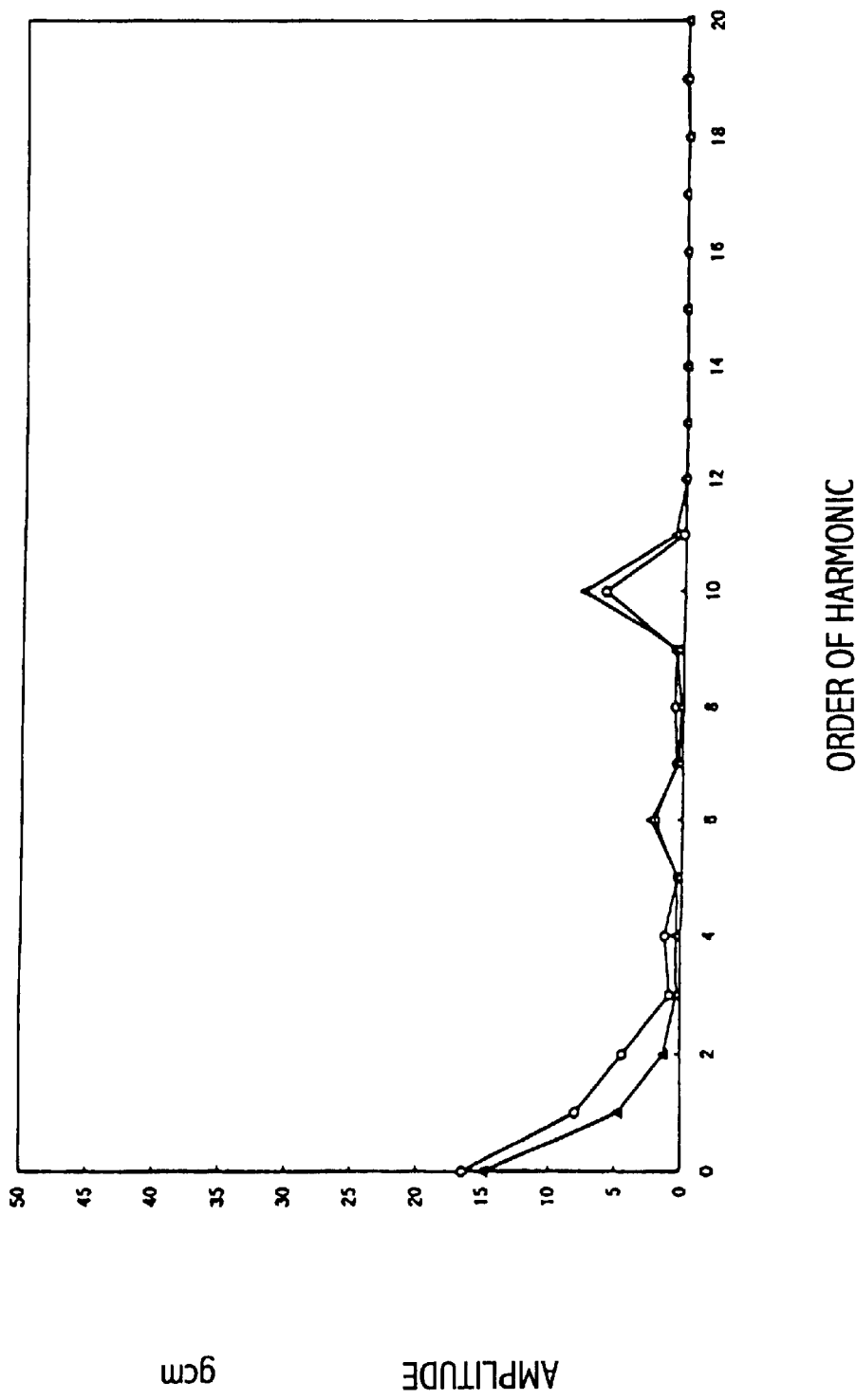
FIG. 11 is a schematic diagram showing a result of frequency analysis of the order of harmonic according to the embodiment of the invention.

Besides, the same measurement was repeated on a plurality of motors produced for trial, and frequency analysis was made on the order of the harmonic for the detent torque property, and the results obtained are as shown in FIG. 11.

The results of this embodiment shown in FIGS. 10 and 11 were compared with the results (see FIGS. 33 and 34) of the conventional three-phase motor having the pitch of the stator pole teeth and the pitch of the rotor pole teeth which are equal, and it was confirmed that the fourth order harmonic, the sixth order harmonic and other harmonics were remarkably decreased.

The results of this embodiment were compared with the results (see FIGS. 31 and 32) of the conventional three-phase motor having the pitch of the stator pole teeth determined on the basis of the relation of PS=PR{1±1/(m·v)}, and it was confirmed that the fourth order harmonic was remarkably decreased.

Thus, by the three-phase stepping motor of this embodiment, the fourth order harmonic can be decreased in a single stator pole, and the sixth order harmonic can also be decreased.

Now, another embodiment of the invention will be described with reference to the drawings.

Figure 12:
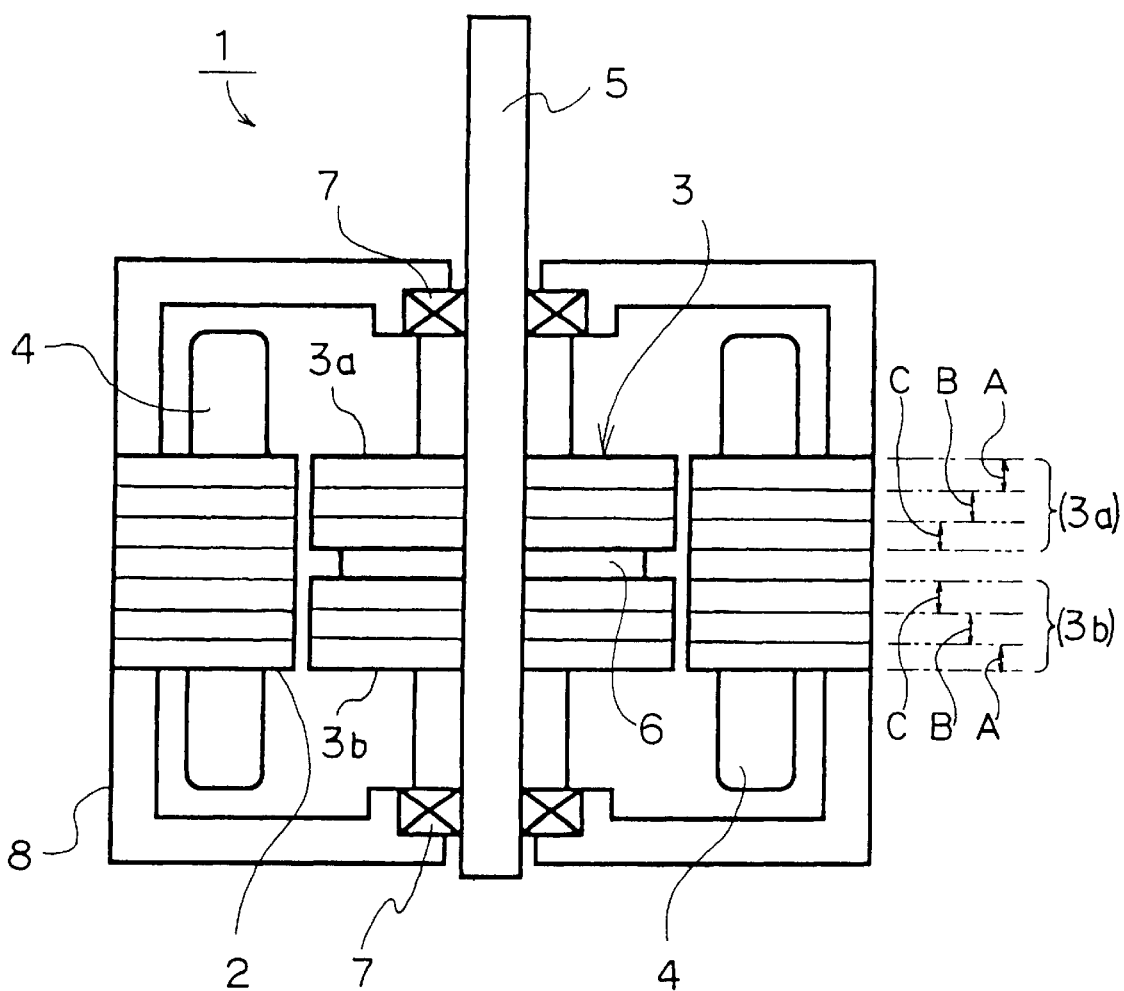
FIG. 12 is a sectional diagram showing a stepping motor according to a further embodiment of the invention.
Figure 13A:
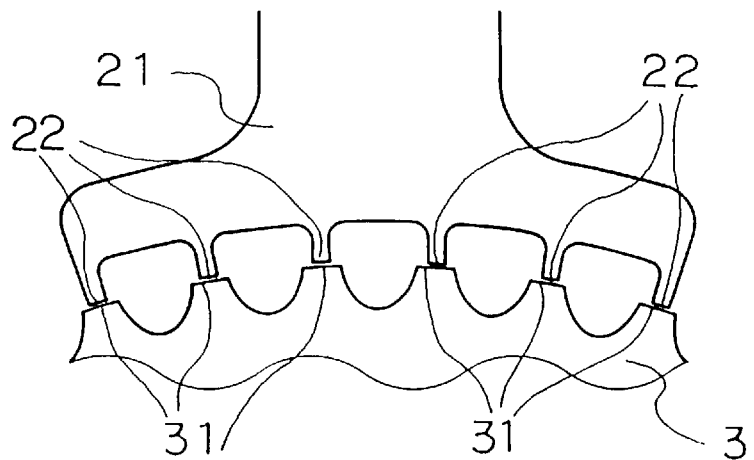
FIG. 13A is a sectional diagram showing a stator and a rotor of a first layer.
Figure 13B:
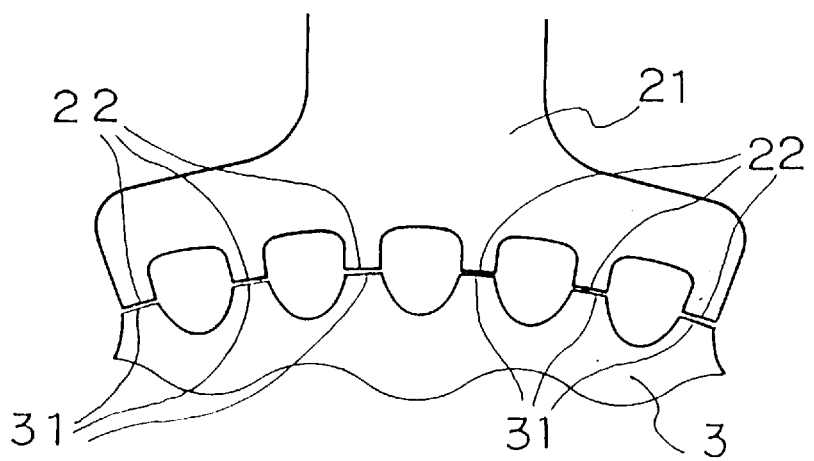
FIG. 13B is a sectional diagram showing a stator and a rotor of a second layer.
Figure 13C:
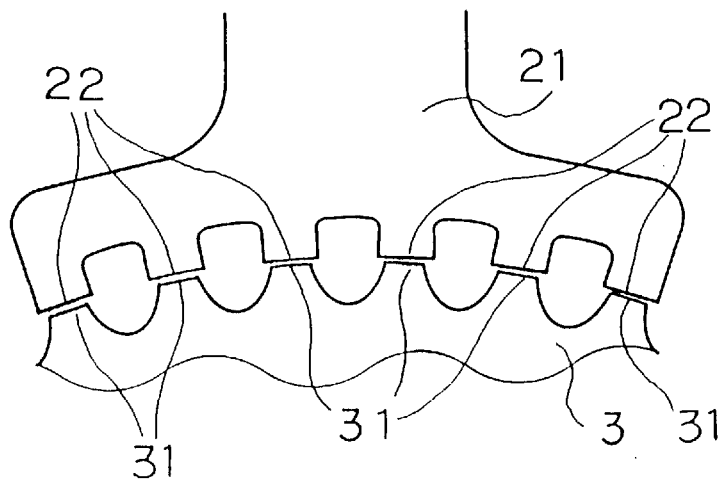
FIG. 13C is a sectional diagram showing a stator and a rotor of a third layer, respectively according to the embodiment of the invention.

As shown in FIGS. 12 and 13, a stepping motor 1 of this embodiment has a stator 2 which is cylindrical and having therein a plurality of stator poles 21 arranged at predetermined intervals, a rotor 3 arranged within the stator 2, a stator coil 4 which is disposed on each of the plurality of stator poles 21, an output axis 5 which is a rotation axis of the rotor 3, and a disk permanent magnet 6 disposed in a required position of the rotor 3 in the same way as the stepping motor of the previous embodiment. It is configured to produce torque on the output axis 5 by exciting the respective stator coils 4. In FIG. 12, 7 is a bearing of the output axis 5, and 8 is a bracket for supporting the stator 2 and the bearing 7.

Stator pole teeth 22 are arranged at predetermined intervals on the leading ends of the individual stator poles 21, and rotor pole teeth 31 are arranged at predetermined intervals on the outer periphery of the rotor 3. The same reference numerals are used for the same parts as those in FIG. 29, and their drawings are omitted.

And, the rotor 3 of this embodiment has two rotor cores 3a, 3b with different phases of the rotor pole teeth 31.

Besides, the stator 2 and the rotor core 3a and the stator 2 and the other rotor core 3b respectively have a first layer A, a second layer B and a third layer C with different tooth widths of the stator pole teeth 22 in the direction of the rotation axis of the rotor 3.

Specifically, the tooth widths of the rotor pole teeth 31 are uniform along the direction of the rotation axis of the rotor 3, while the tooth widths of the stator pole teeth 22 are formed larger than the rotor pole teeth 31 for the first layer A, substantially the same with the rotor pole teeth 31 for the second layer B and smaller than the rotor pole teeth 31 for the third layer C.

Figure 14:
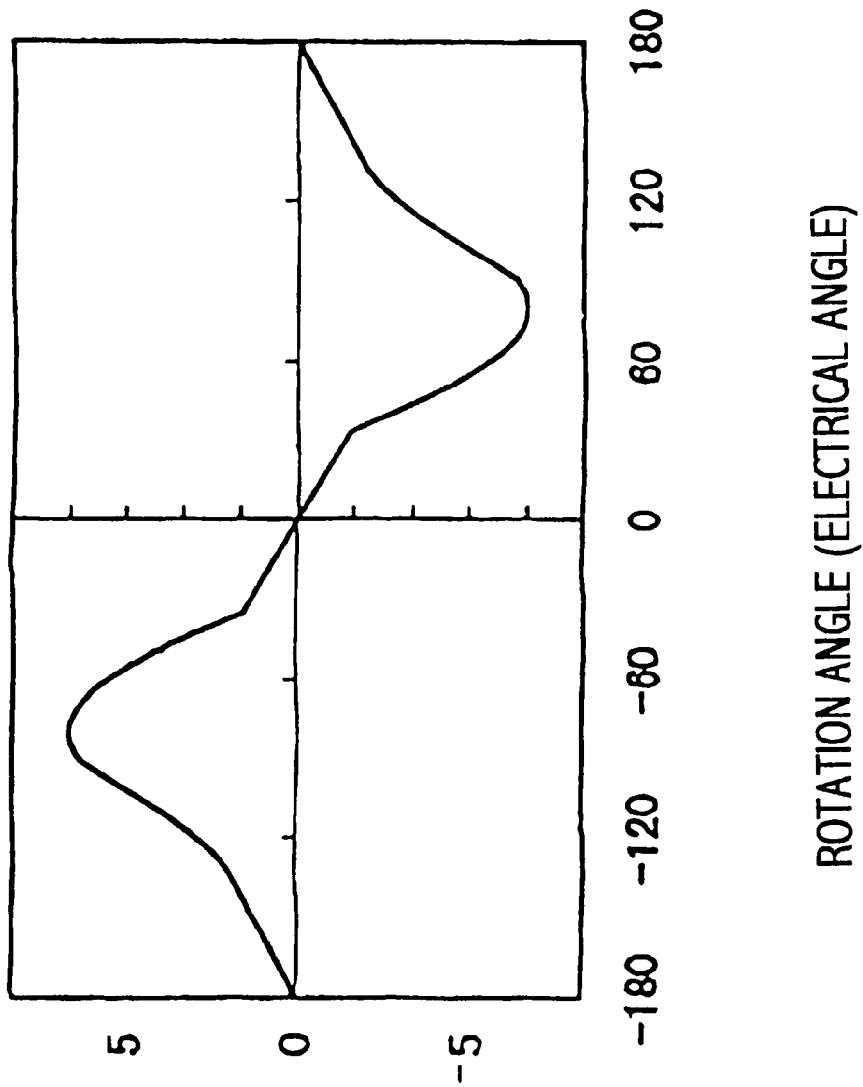
FIG. 14 is a diagram showing detent torque property produced in a first layer related to a single stator pole tooth according to the embodiment of the invention.
Figure 15:
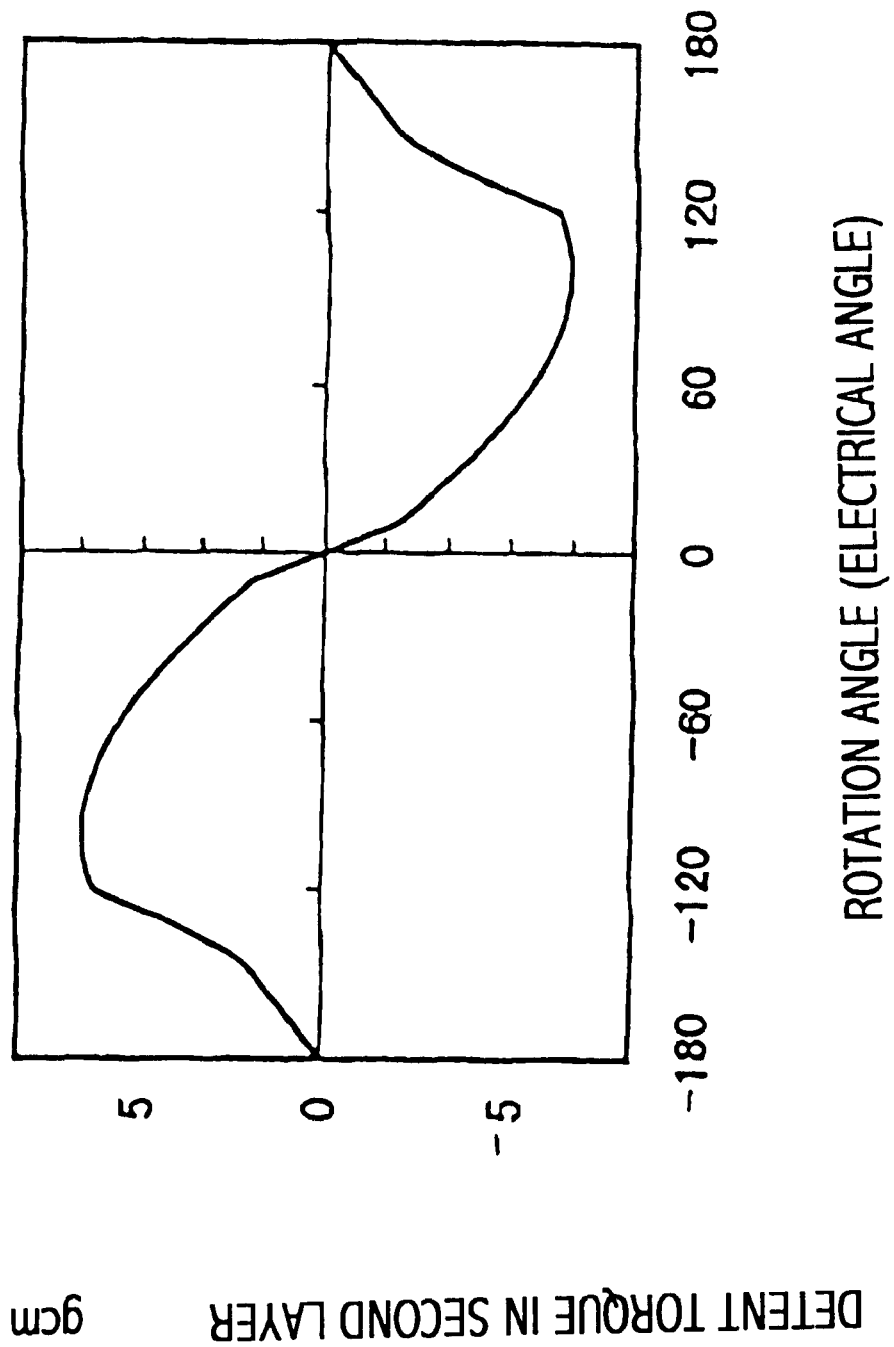
FIG. 15 is a diagram showing detent torque property produced in a second layer related to a single stator pole tooth according to the embodiment of the invention.
Figure 16:
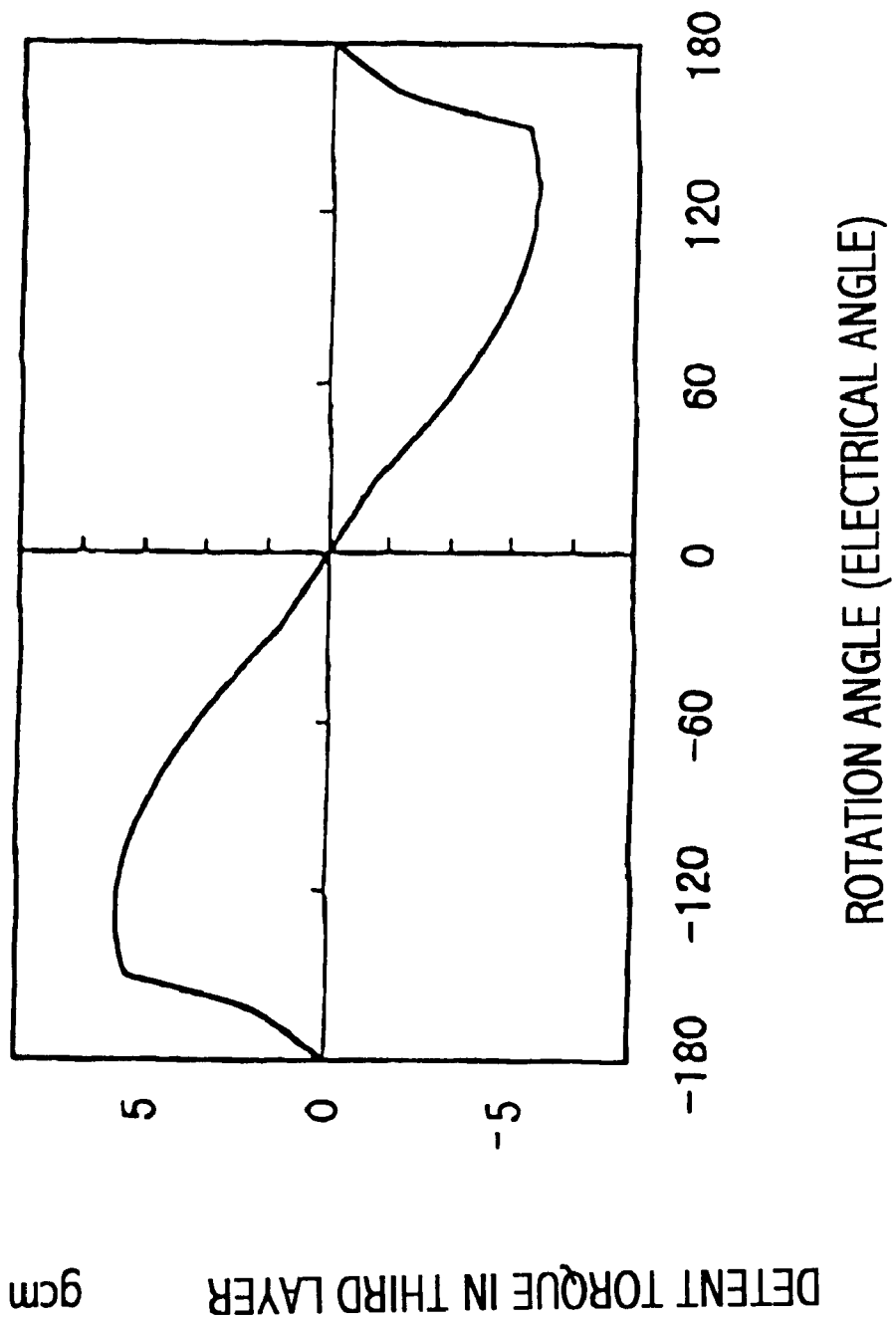
FIG. 16 is a diagram showing detent torque property produced in a third layer related to a single stator pole tooth according to the embodiment of the invention.
Figure 17:
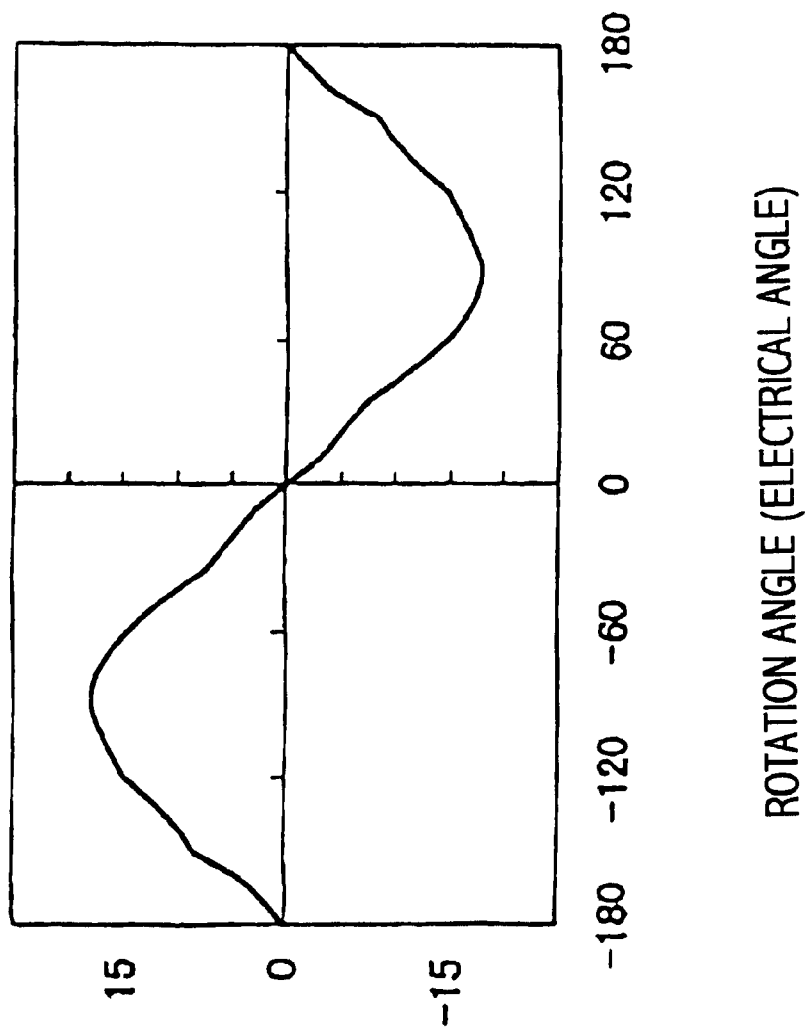
FIG. 17 is a diagram showing detent torque property produced between one stator pole tooth and a rotor pole tooth of one of rotor cores according to the embodiment of the invention.

Detent torques produced in the first layer A, the second layer B and the third layer C between one stator pole tooth 22 and the rotor pole tooth 31 of the rotor core 3a or between one stator pole tooth 22 and the rotor pole tooth 31 of the other rotor core 3b have different waveforms as shown in FIGS. 14, 15 and 16.

Therefore, the waveforms of the detent torques produced between them are combinations of waveforms of detent torques produced in the first layer A, the second layer B and the third layer C and approximate to a sine wave than to the waveform of detent torques produced in the respective layers.

As a result, in the stepping motor 1 as the whole, detent torques produced between the rotor pole teeth 31 and the stator pole teeth 22 with different phases in the circumference direction are mutually cancelled accurately, and undesired vibration and noise due to the detent torque are reduced when the motor is running.

In the stator 2 and the two rotor cores 3a, 3b of this embodiment, the respective layers are sequentially arranged in order of the first layer A, the second layer B, the third layer C, the third layer C, the second layer B and the first layer A (see FIG. 12). The permanent magnet 6 is placed between the rotor cores 3a and 3b.

Specifically, the stability of supporting the rotor 3 is secured because the plurality of layers having different tooth widths are symmetrically disposed on the two rotor cores 3a, 3b.

As to the occurrence of detent torque with different waveforms in the respective layers, the tooth widths of the stator pole teeth 22 are made different, and the tooth widths of the rotor pole teeth 31 may also be made different. Besides, the tooth widths of both of them may also be made different.

And, the respective layers have the same thickness in this embodiment but may be determined appropriately depending on the waveforms and sizes of the detent torque produced in the layers.

Figure 18:
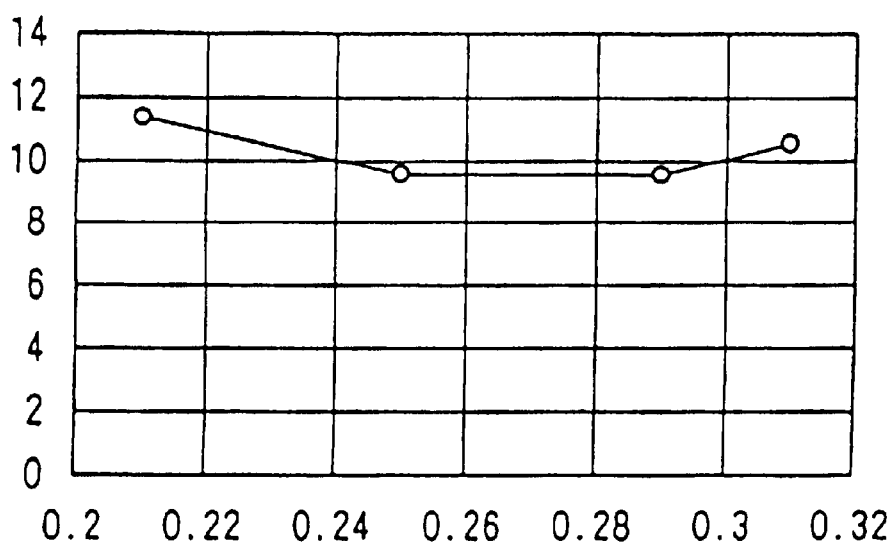
FIG. 18 is a diagram showing a ratio of harmonic component contained in detent torque in a first layer according to another embodiment of the invention.
Figure 19:
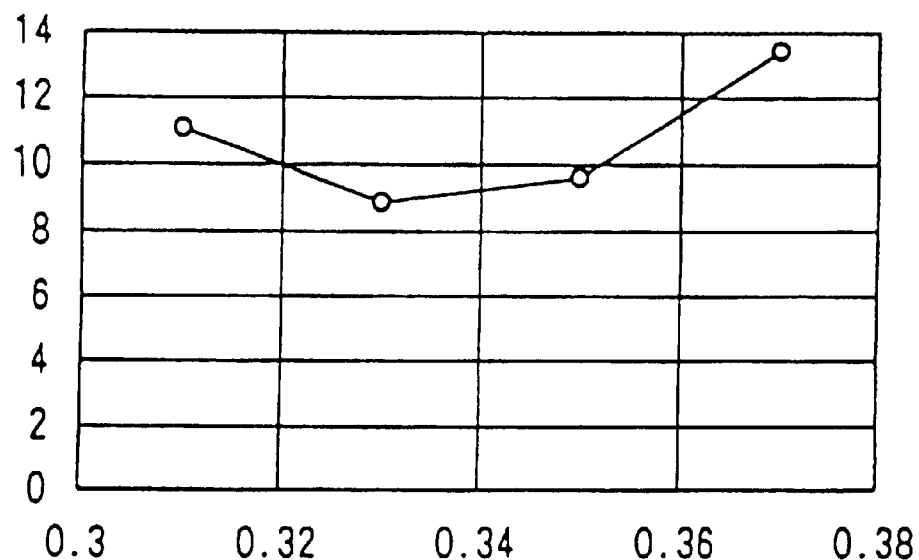
FIG. 19 is a diagram showing a ratio of harmonic component contained in detent torque in a second layer according to the embodiment of the invention.
Figure 20:
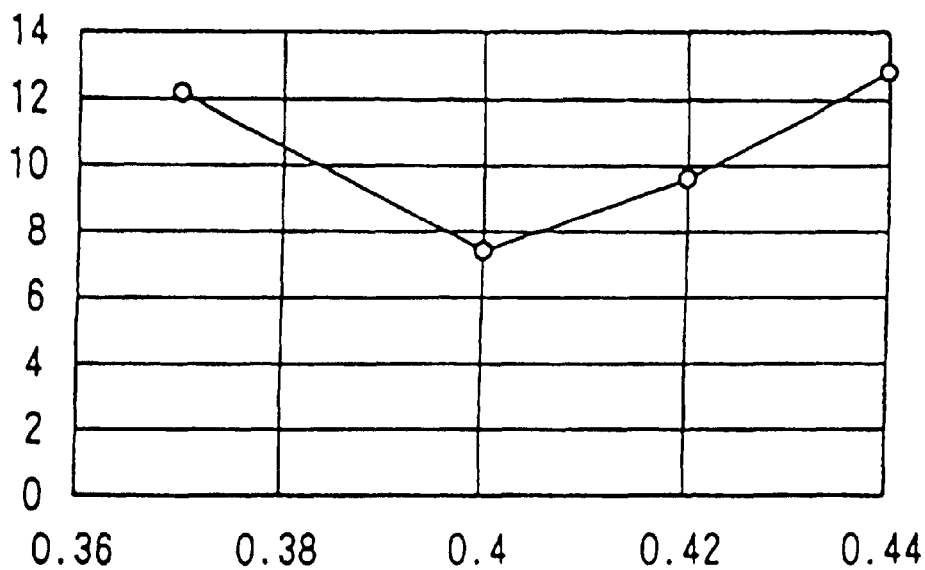
FIG. 20 is a diagram showing a ratio of harmonic component contained in detent torque in a third layer according to the embodiment of the invention.

FIGS. 18, 19 and 20 are diagrams showing a ratio of the harmonic component contained in the detent torque of one stator pole tooth.

In this embodiment, the average of the tooth width ratio of the stator pole teeth 22 and the tooth width ratio of the rotor pole teeth 31 is set to 0.25 for the first layer A, 0.33 for the second layer B and 0.42 for the third layer C. Here, a ratio of the second order harmonic component to the fourth order harmonic component contained in the detent torque was measured by changing the average of the tooth width ratio of each layer.

The tooth width ratio is a value obtained by dividing the tooth width of the stator pole teeth 22 or the rotor pole teeth 31 by the pitch of the pole teeth, which is a ratio occupied by the pole teeth around the rotation axis of the rotor 3. And, such tooth width and pitch are indicated by an angle of the rotor 3 to the circumference of the rotation axis.

Specifically, the tooth width ratio of the rotor pole teeth 31 is 0.34 along the direction of the rotation axis of the rotor 3, while the tooth width ratio of the stator pole teeth 22 is 0.16 for the first layer A, 0.32 for the second layer B and 0.50 for the third layer C.

The drawings show the ratios of the second order harmonic component to the fourth order harmonic component when the average of the tooth width ratio of the first layer is changed for the stator 2 and the rotor 3 configured as described above by changing the tooth width ratio of the stator pole teeth 22 (see FIG. 18), the average of the tooth width ratio of the second layer (see FIG. 19) and the average of the tooth width ratio of the third layer (see FIG. 20) by changing the tooth width ratio of the stator pole teeth 22.

As shown in the drawings, the ratio of the second order harmonic component to the fourth order harmonic component contained in the detent torque is varied depending on the average of the tooth width ratio of the stator pole teeth 22 and the tooth width ratio of the rotor pole teeth 31 and is about 10% or below when the average of the tooth width ratio is 0.25 to 0.29 for the first layer A, 0.33 to 0.35 for the second layer B and 0.40 to 0.42 for the third layer C. And the main component of the harmonic can be made relatively small, and the distortion of the waveform of the detent torque can be reduced.

The same measurement was made when the tooth width ratio of the rotor pole teeth 31 is 0.32 along the direction of the rotation axis of the rotor 3. It was confirmed that the ratio of the second order harmonic component to the fourth order harmonic component contained in the detent torque was about 10% or below when the average of the tooth width ratio of the stator pole teeth 22 and the tooth width ratio of the rotor pole teeth 31 in each layer was 0.25 to 0.29 for the first layer A, 0.33 to 0.35 for the second layer B and 0.40 to 0.42 for the third layer C.

Thus, an influence of the harmonic in the detent torque can be lowered by setting the tooth width ratio in the aforesaid ranges.

Figure 21:
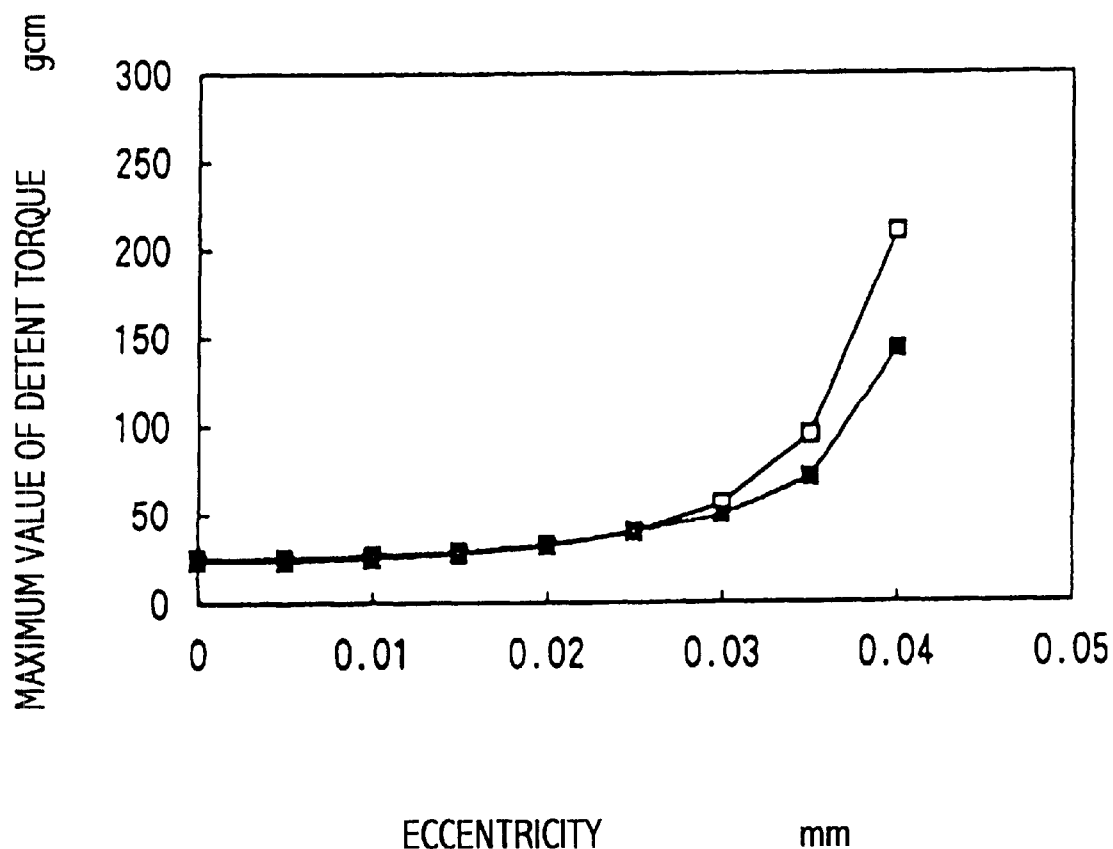
FIG. 21 is a diagram showing a change in detent torque of the stepping motor as a whole involved in eccentricity according to the embodiment of the invention.

FIG. 21 is a diagram showing changes in maximum values of the detent torque of the stepping motor 1 as a whole involved in eccentricity of the output axis 5.

In the drawing, white plotted dots indicate a prior art configured to have substantially the same maximum value of the detent torque in a state having eccentricity of 0 mm by appropriately setting the pitches of the respective pole teeth as in this embodiment. The tooth widths of the stator pole teeth and the rotor pole teeth are the same in the direction of the rotation axis of the stator.

When they are compared, it is confirmed that the increase of the detent torque involved in the eccentricity is lowered in this embodiment.

This is because the prior art is configured to cancel the harmonics between the paired stator pole teeth, so that it is easily affected by a magnetic imbalance due to eccentricity, falling and the like of the rotor to the stator, while the waveform of detent torque produced between one stator pole tooth 22 and the rotor pole teeth 31 of the rotor core 3a (or 3b) of this embodiment is approximated to the sine wave by combining the detent torques of the respective layers, so that an influence of magnetic imbalance due to eccentricity, falling or the like of the rotor 3 to the stator 2 can be prevented.

In order to decrease the harmonic more efficiently, a layer may be arranged with a different tooth width for one or both of the stator pole teeth 22 and the rotor pole teeth 31, and the stator pole teeth 22 may be determined to have an appropriate pitch.

As described above, in the stepping motor of this embodiment, the rotor has two rotor cores with different phases of the rotor pole teeth, the stator and one rotor core as well as the stator and the other rotor core have a plurality of layers with different tooth widths of one or both of the stator pole teeth and the rotor pole teeth in the direction of the rotation axis of the rotor, and the waveform of detent torque produced between one stator pole tooth and the rotor pole teeth of one of the rotor cores as well as one stator pole tooth and the rotor pole teeth of the other rotor core can be approximated to the sine wave by combining the detent torques of the respective layers. As a result, the detent torques accurately cancel each other, and undesired vibration and noise due to the detent torque can be reduced.

There is a conventional one which is configured to cancel the harmonics between a paired stator pole teeth by appropriately setting the pitch of respective pole teeth. But, it is not satisfactory because it is easily influenced by magnetic imbalance due to eccentricity, falling or the like of the rotor with respect to the stator. On the other hand, this embodiment combines the detent torques of the individual layers to approximate the waveform of the detent torque to the sine wave, so that an influence of magnetic imbalance due to eccentricity, falling or the like of the rotor to the stator is avoided. As a result, undesired increase of the detent torque is suppressed.

And, by the stepping motor of this embodiment, the plurality of layers with different tooth widths comprise at least three layers, so that the detent torque of one stator pole tooth can be further approximated to the sine wave.

By the stepping motor of this embodiment, the tooth width ratio of the rotor pole teeth is uniform along the direction of the rotation axis of the rotor, and the stator and the rotor core have the layer of 0.25 to 0.29, the layer of 0.33 to 0.35 and the layer of 0.40 to 0.42 in the average of the tooth width ratio of the stator pole teeth and the tooth width ratio of the rotor pole teeth, so that a ratio of the harmonic component contained in the detent torque can be made relatively small. In other words, when the tooth width ratio is set in the aforesaid ranges, a distortion of the waveform of the detent torque due to the harmonic can be reduced without fail.

And, by the stepping motor of this embodiment, the plurality of layers with different tooth widths of the stator and the two rotor cores are symmetrically disposed toward the direction of the rotation axis of the rotor, so that stability of supporting the rotor can be secured.

In other words, when the layers having different tooth widths are stacked, the respective layers have different torque when the motor is driven, and the support balance of the rotor may be degraded. But, this embodiment can avoid such a situation.

Now, another embodiment of the invention will be described. Here, a two-phase hybrid stepping motor will be referred to for description.

Figure 22:
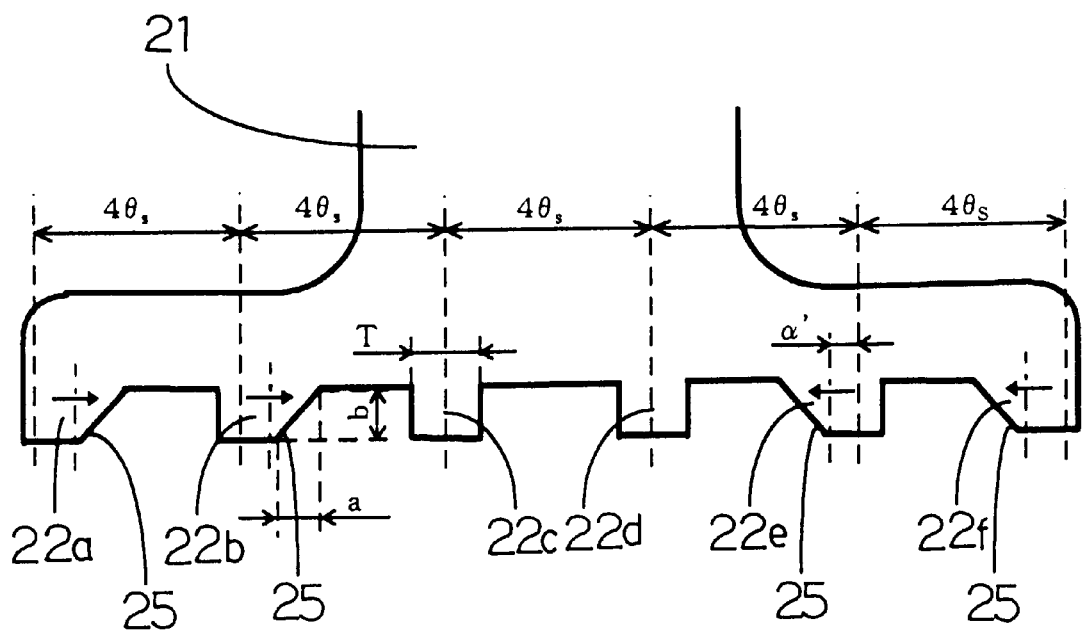
FIG. 22 is a developed diagram showing a shape and a positional relation of pole teeth of a motor according to the invention.

FIG. 22 is a diagram showing one of the stator poles 21 of a two-phase hybrid stepping motor with the mutual positional relation and shape of the pole teeth 22 developed. In the two-phase hybrid stepping motor, the plurality of stator poles 21 are formed tilted by a predetermined angle so to be arranged at equal intervals. As a result, when the phase of the pole teeth 22 of A-phase stator pole 2a matches the pole teeth on the N side of the rotor, the pole teeth 22 of B-phase stator pole are formed displaced by ¼ pitch of the pole teeth. And, the pole teeth 22 of the A-phase stator pole 2a are displaced by ⅔ pitch from the pole teeth on the S side of the rotor, and the pole teeth 22 of the B-phase stator pole are formed displaced by ¾ pitch. Therefore, the stepping motor can control its rotation by every ¼ pitch of the pole teeth by exciting.

Accordingly, when it is assumed that P is the number of phases of the stepping motor and N is the number of the pole teeth of the rotor, control can be made with the step number 2PN and basic step angle θs. The basic step angle θs is expressed by the following expression (2).

$$\theta s = 360°/(2PN) \quad (2)$$

In this embodiment, N=50, and the outer diameter of the rotor is 25 mm.

In FIG. 22, the pole teeth of the motor are formed with two pole teeth 22a, 22b displaced in the forward direction, two pole teeth 22e, 22f displaced in the lagging direction, two pole teeth 22c, 22d not displaced from the positions where six pole teeth 22 of the each stator pole 21 are arranged with equal pitch (4θs). Thus, the harmonic component of the detent torque can be reduced with the fourth order component of torque determined as zero. In FIG. 22, the forward direction is a rightward direction.

And, the two pole teeth displaced in the forward direction have the leading ends toward the forward direction (right side) cut off to form a slanted portion 25. The two pole teeth displaced in the lagging direction have the leading ends toward the lagging direction (left side) cut off to form a slanted portion 25. In other words, the leading ends on the displaced side are cut off to form the slanted portions.

Gap permeance of each pole tooth portion is changed by forming the slanted portion on the pole teeth, resulting in moving the magnetic center position. Its direction is opposite from the direction that the pitch is displaced in order to reduce the detent torque. Therefore, the amount of displacement of each pole tooth is increased according to the amount of movement.

Here, the gap permeance and the magnetic center position were determined as follows. First, when the pole teeth of the rotor are opposed to the pole teeth of the stator, a gap at a portion to determine permeance is divided into fine sections along the circumferential direction. And, a distance between the pole teeth, namely a magnetic path length of the gap portion, is calculated for every section and converted into permeance. Then, the permeance is integrated on all the divided sections to obtain the gap permeance. Then, as to the magnetic center position, it was assumed that the pole teeth were divided at a given position into two sections in the circumferential direction, and a position where the gap permeance of the divided sections become equal was determined as the magnetic center position.

Besides, the gap permeance of each pole tooth section is lowered when the slanted portion is formed on the pole tooth as described above. Therefore, the tooth width is increased for the corresponding amount, and a lowered portion is compensated to keep the gap permeance at a constant level. And, the magnetic center position of teeth is moved in a direction opposite from the direction that the pitch was displaced in order to reduce the detent torque by increasing the tooth width. Therefore, the pitch of each pole tooth is further displaced for the amount of movement. Specifically, there is a relation expressed by the following expression (3) between an amount of displacement α' of the pole teeth of this embodiment and an amount of displacement α of the pole teeth of prior art.

α'=α+(amount of displacement of the magnetic center position due to the formation of the slanted portion on the pole teeth)+ (amount of displacement of the magnetic center position due to the increase of the tooth width) (3).

The centerline marked on the pole teeth having the pitch displaced in FIG. 22 indicates a geometrical center position and not a magnetic center position. In this embodiment, dimensions (a, b in FIG. 22) of the slanted portion 25 and the relation of the pole tooth 22c with a tooth width T were determined by the following expressions (4) and (5) as a preferable example, wherein a is 0.35 mm and b is 0.53 mm.

$$a = 0.7 \times T \quad (4)$$

$$b = 1.5 \times a \quad (5)$$

As described above, the magnetic center position of the pole teeth in this embodiment is equal to the center position of the pole teeth of the prior art. And, the gap permeance of the pole teeth portion is also equal to that of the prior art. As a result, the original purpose of reducing the harmonic component of the detent torque and the control of vibration and noise of the motor can be made. In addition, a fundamental wave (first order) component of torque can be increased. Such states are shown is FIG. 23. FIG. 23 shows results of analysis made on a flow of magnetic flux about the stator pole 21a and the rotor pole teeth 31 of the motor with non-linearity of a material taken into account by using a computer. FIG. 23 shows an example of the motor of this embodiment, (a) shows that the center of the pole tooth 31 of the rotor matches the center of the pole tooth 22d of the stator and the pole teeth are mutually opposed, and (b)

shows that the rotor has been turned from the matched position by ½ pitch, so that the pole teeth do not match with each other. When compared with a conventional motor which does not have the slanted portion on the pole teeth 22 (FIG. 40), the magnetic flux is substantially equal when the pole teeth are mutually opposed. On the other hand, when the pole teeth are not opposed to each other, magnetic flux is hard to flow. As a result, a difference of magnetic flux is large between (a) and (b). Compared with the motor which has the pole teeth 22 arranged with equal pitch (FIG. 39), the difference of magnetic flux between (a) and (b) was conventionally lowered to 88%. But, it is suppressed to 91% in this embodiment. Namely, the formation of the slanted portion by cutting off the leading end of the pole teeth improves the torque by 3%.

Figure 24:
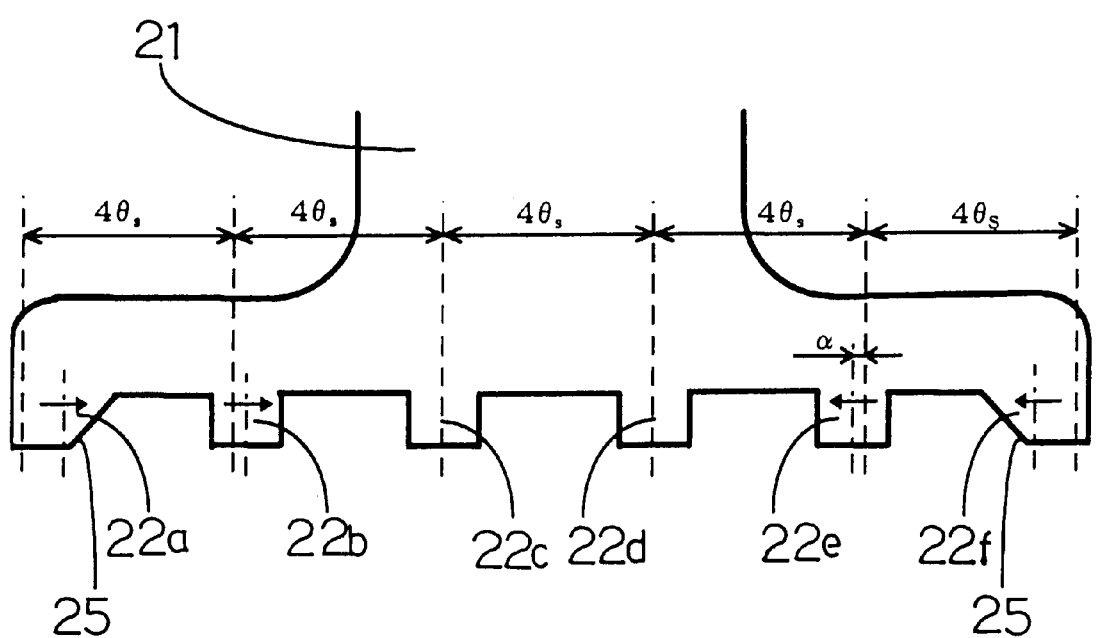
FIG. 24 is a developed diagram showing a shape and a positional relation of pole teeth of a motor according to another embodiment of the invention.

In this embodiment, the slanted portion is formed on all four pole teeth which have the pitch displaced, but the number of pole teeth on which the slanted portion is formed is not limited to four but may be any number. For example, FIG. 24 shows an example that the slanted portion is formed on only two pole teeth 22a, 22f among the four pole teeth which have the pitch displaced. In this example, the difference of magnetic flux between (a) and (b) is lowered to only 90%. Thus, the torque is improved by cutting off the leading ends of the pole teeth to form the slanted portions.

Specifically, the pole teeth which have the slanted portions at the leading ends have a wider dedendum than the other portion. But it is not a mere difference of the tooth width. The present invention is characterized by that the magnetic path length of the gap portion can be increased when the pole teeth are not opposed to each other, and the fundamental wave (first order) component of the torque can be increased as a result. Since the slanted portions are merely formed at the leading ends and the width of the dedendum is not decreased, the inconvenience of increasing the saturation involved in the prior art is not caused.

Figure 25:
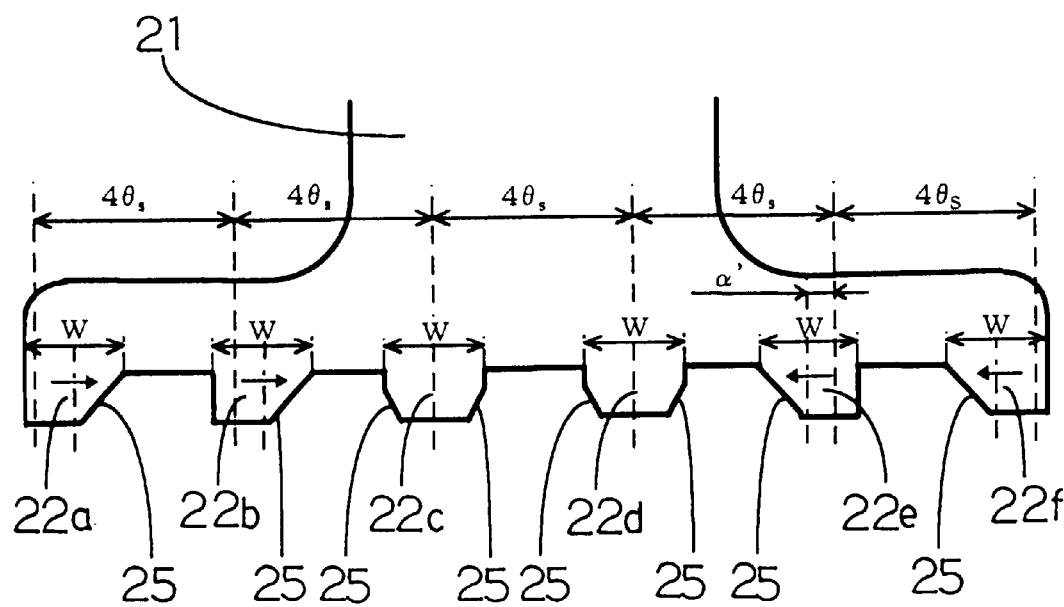
FIG. 25 is a developed diagram showing a shape and a positional relation of pole teeth of a motor according to another embodiment of the invention.

FIG. 25 is a diagram showing one of the stator poles 21 of a two-phase hybrid stepping motor according to another embodiment of the invention with the mutual positional relation and shape of the pole teeth 22 developed. The motor pole teeth of FIG. 25 are formed in the same way as the aforesaid embodiment by having two pole teeth 22a, 22b displaced in the forward direction, two pole teeth 22e, 22f displaced in the lagging direction and two pole teeth 22c, 22d not displaced from the positions where six pole teeth 22 of the each stator pole 21 are arranged with equal pitch (4θs). In FIG. 25, the forward direction is also a rightward direction.

And, the pole teeth displaced in the forward or lagging direction have the leading ends on the side toward the displaced direction cut off and a slanted portion 25 is formed. The magnetic center position of the individual pole teeth is moved in a direction opposite from the direction of displacing the pitch by the formation of the slanted portion on the pole teeth. Therefore, the amount of displacement of each pole tooth is increased for the amount of displacement. Besides, the gap permeance of the individual pole teeth is further lowered by forming the slanted portion on the pole teeth. Accordingly, the tooth width is increased for an amount corresponding to the lowering so to compensate the lowered portion, thereby keeping the gap permeance at a constant level. Here, the magnetic center position of the teeth is also moved in a direction opposite from the direction that the pitch is displaced by increasing the tooth width. Therefore, the pitch of the individual pole teeth is further displaced according to the amount of movement.

Furthermore, the motor of this embodiment is set to have the same width W for all the dedendums by cutting off the leading ends including the pole teeth 22c, 22d not displaced and forming the slanted portion. But, the non-displaced pole teeth 22c, 22d are cut off at their both ends to form the slanted portion 25, so that the magnetic center position is not moved. In this embodiment, the width W of the dedendum was set to 0.73 mm as a preferable example.

Thus, the harmonic component of the detent torque originally targeted can also be decreased in this embodiment, and the vibration and noise of the motor can be suppressed. In addition, the fundamental harmonic (first order) component of the torque can be increased. The state described above is shown in FIG. 26. FIG. 26 shows an example of this motor, (a) showing a state that the center of the pole tooth 31 of the rotor matches the center of the pole tooth 22d of the stator and the pole teeth are mutually opposed, and (b) showing that the rotor has been turned from the matched position by ½ pitch, so that the pole teeth do not match each other. When compared with the conventional motor which does not form the slanted portion on the pole teeth 22 (FIG. 40), the magnetic flux is substantially equal when the pole teeth are mutually opposed but, when the pole teeth are not opposed to each other, magnetic flux is hard to flow. As a result, a difference of magnetic flux is large between (a) and (b). Compared with the motor which has the pole teeth 22 arranged with equal pitch (FIG. 39), the difference of magnetic flux between (a) and (b) is lowered to only 90%. Namely, the formation of the slanted portion by cutting off the leading ends of the pole teeth improves the torque regardless of whether the widths of the dedendums are determined to be the same.

The aforesaid embodiment was described with reference to the two-phase hybrid stepping motor but not limited to it. Generally it can also be applied to P-phase stepping motors. And, the leading ends of the pole teeth were cut off linearly, but the same effect can also be obtained by cutting off the leading ends into the shape of a curve such as an arc.

Figure 27:
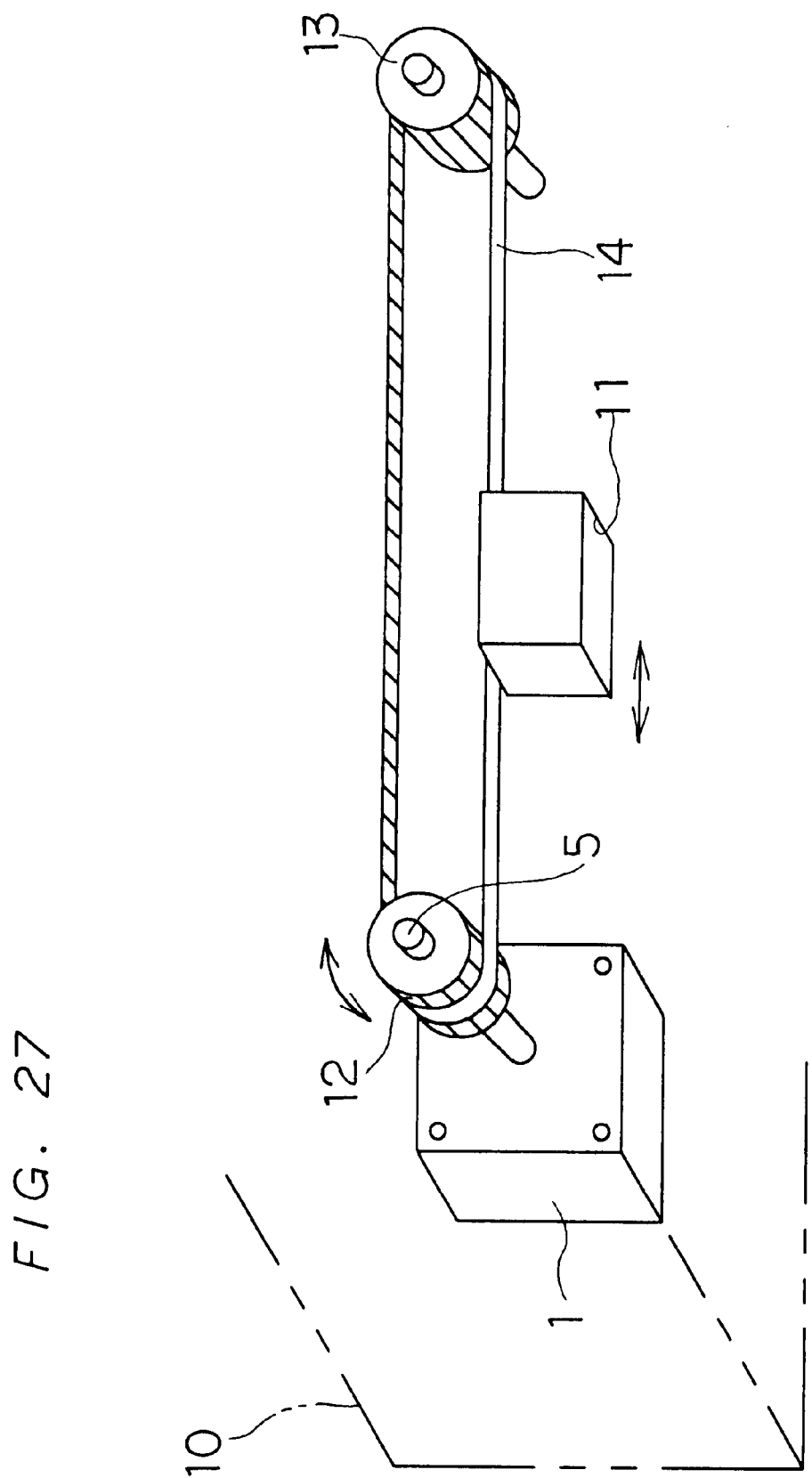
FIG. 27 is a perspective view showing a state that a stepping motor of the invention is used to drive a printing head of a printer.

FIG. 27 shows that the aforesaid stepping motor 1 drives a printing head 11 of a printer 10, so that a pulley 12 is secured to an output axis 5 of the stepping motor 1, and a follower pulley 13 is mounted on another point, and a transfer belt 14 to which the printing head 11 is fixed is put around the pulleys to configure the printing device. The stepping motors 1 of the respective embodiments can efficiently lower the harmonic and provides smoother and quieter rotations. And the positioning accuracy is also improved. Thus, they are suitable for a motor used for a printing device to drive the printing head of a printer.

Figure 28:
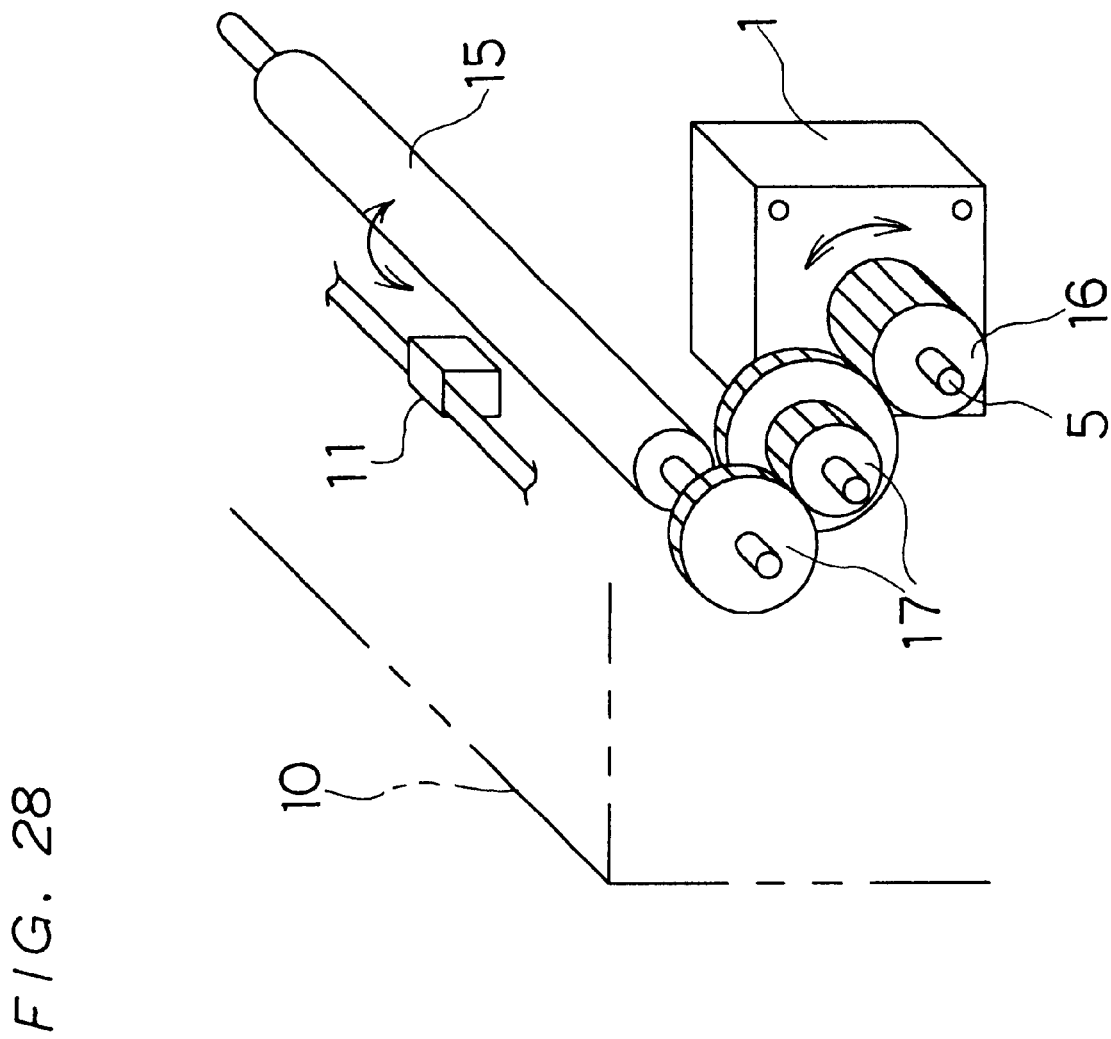
FIG. 28 is a perspective diagram showing a state that a stepping motor of the invention is used to drive a paper feed roller of a printer.

FIG. 28 shows that a paper-feed roller 15 of the printer 10 is driven by the stepping motor 1, and a gear 16 is fixed to the output axis 5 of the stepping motor 1 to transfer the drive force to the paper-feed roller 15 through transfer gears 17. In this paper-feed device, the stepping motor 1 can efficiently lower the harmonic to provide quieter and smoother rotations, and the positioning accuracy is also improved. Therefore, it is suitable for the motor used for the paper-feed device for driving the paper-feed roller of the printer.

INDUSTRIAL APPLICABILITY

The stepping motor according to the present invention can rotate quieter and smoother, and its positioning accuracy is also improved. Therefore, it is suitable for office equipment, and particularly for various types of drive motors for printers.

What is claimed is:

1. A stepping motor comprising a stator having a plurality of stator poles and a rotor disposed to oppose the stator poles with a space therebetween, the rotor having rotor pole teeth disposed with a predetermined pitch P1 and the stator poles having stator pole teeth opposed to the rotor pole teeth, wherein:

each of stator poles is provided with n sets of tooth groups, each group consisting of the stator pole teeth in the number of m, a pitch P2 of the stator pole teeth in the tooth groups meets the following formula:

$$P2 \neq P1,$$

and a pitch P3 of the tooth groups meets the following formulas:

$$P3 \neq m \cdot P2$$

$$P3 \neq m \cdot P2$$

where, P1, P2 and P3 denote electrical angles, and m and n are integers of 2 or more, thus reducing harmonics of a plurality of orders within each of the stator poles.

2. A stepping motor according to claim 1, wherein the stepping motor is a three-phase motor which has at least the fourth order harmonic and the sixth order harmonic lowered.

3. A three-phase stepping motor comprising a stator having a plurality of stator poles and a rotor disposed to oppose the stator poles with a space therebetween, the rotor having rotor pole teeth disposed with a predetermined pitch PR and the stator poles having stator pole teeth opposed to the rotor pole teeth, wherein:

each of stator poles is provided with the stator pole teeth in the number of m, a pitch PS of the stator pole teeth meets the following formula:

$$PS = PR\{1 \pm i/(m \cdot 4)\},$$

and $$PS = PR\{1 \pm i'/(m \cdot 6)\},$$

where, i and i' are positive integers which are not a multiple of m.

4. A stepping motor according to any of claims 1, or 3, wherein at least one of the stator pole teeth is provided with a slanted portion and has a shape different from that of other pole teeth.

5. The stepping motor according to claim 1, or 3, wherein said stepping motor is incorporated in a printer to drive a printhead of said printer.

6. The stepping motor according to claim 1, or 3, wherein said stepping motor is incorporated in a printer to drive a paper-feed roller of said printer.

* * * * *